United States Patent
Shriner et al.

(10) Patent No.: US 12,533,079 B2
(45) Date of Patent: Jan. 27, 2026

(54) EAR-WEARABLE SYSTEM AND METHOD FOR DETECTING HEAT STRESS, HEAT STROKE AND RELATED CONDITIONS

(71) Applicant: Starkey Laboratories, Inc., Eden Prairie, MN (US)

(72) Inventors: Paul Shriner, Hopkins, MN (US); Paul N. Reinhart, Minneapolis, MN (US); Andy S. Lin, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 332 days.

(21) Appl. No.: 18/147,355

(22) Filed: Dec. 28, 2022

(65) Prior Publication Data
US 2023/0210464 A1    Jul. 6, 2023

Related U.S. Application Data

(60) Provisional application No. 63/295,032, filed on Dec. 30, 2021.

(51) Int. Cl.
*A61B 5/00*      (2006.01)
*A61B 5/0205*   (2006.01)
(Continued)

(52) U.S. Cl.
CPC ........ *A61B 5/6817* (2013.01); *A61B 5/02055* (2013.01); *A61B 5/02438* (2013.01);
(Continued)

(58) Field of Classification Search
None
See application file for complete search history.

(56) References Cited

U.S. PATENT DOCUMENTS

| 6,283,915 B1 | 9/2001 | Aceti et al. |
| 7,285,090 B2 | 10/2007 | Stivoric et al. |

(Continued)

FOREIGN PATENT DOCUMENTS

| JP | 4975249 | 4/2012 |
| WO | 2016038585 | 3/2016 |

(Continued)

OTHER PUBLICATIONS

Buffa, R., et al., "Bioelectrical Impedance Vector Analysis Detects Low Body Cell Mass and Dehydration in Patients with Alzheimer's Disease," J Nutr Health Aging. Dec. 2010;14(10):823-7 (5 pages).

(Continued)

*Primary Examiner* — Carl H Layno
*Assistant Examiner* — Manolis Pahakis
(74) *Attorney, Agent, or Firm* — Pauly, DeVries Smith & Deffner LLC

(57) ABSTRACT

Embodiments herein relate to ear-wearable systems and devices for detecting heat stress and related methods. In an embodiment, an ear-wearable heat stress risk assessment system is included having a control circuit, a microphone, and a sensor package. The system is configured to process signals of one or more sensors of the sensor package and/or the microphone, detect dehydration symptoms, environmental conditions, and activity levels of a device wearer based on the processed signals, and determine a heat stress risk level based on detected dehydration symptoms, environmental conditions, and activity levels of the device wearer. Other embodiments are also included herein.

20 Claims, 14 Drawing Sheets

(51) Int. Cl.
*A61B 5/024* (2006.01)
*A61B 5/11* (2006.01)
(52) U.S. Cl.
CPC .......... *A61B 5/1118* (2013.01); *A61B 5/4875* (2013.01); *A61B 2560/0242* (2013.01)

(56) References Cited

U.S. PATENT DOCUMENTS

| | | | |
|---|---|---|---|
| 9,017,586 | B2 | 4/2015 | Cabell et al. |
| 9,107,586 | B2 | 8/2015 | Tran |
| 9,167,356 | B2 | 10/2015 | Higgins et al. |
| 9,210,518 | B2 | 12/2015 | Zhang |
| 9,219,964 | B2 | 12/2015 | Merks |
| 9,554,484 | B2* | 1/2017 | Rogers .................. H05K 1/189 |
| 9,848,273 | B1 | 12/2017 | Helwani et al. |
| 10,307,101 | B1* | 6/2019 | Miller .................. A61B 5/0059 |
| 10,980,491 | B1* | 4/2021 | Jones .................. A61B 5/0022 |
| 11,100,767 | B1* | 8/2021 | Lee .................... G08B 21/0446 |
| 11,389,112 | B1* | 7/2022 | Miller .................. A61B 5/6843 |
| 11,475,751 | B1* | 10/2022 | Lee ...................... A61B 5/7282 |
| 2004/0242976 | A1* | 12/2004 | Abreu .................... A61B 5/746 600/315 |
| 2010/0217099 | A1* | 8/2010 | LeBoeuf .............. A61B 5/6815 600/301 |
| 2012/0143019 | A1* | 6/2012 | Russell .................. G16H 50/20 600/301 |
| 2013/0049955 | A1* | 2/2013 | Hoover ................ B60N 2/0025 340/539.11 |
| 2014/0330094 | A1 | 11/2014 | Pacione et al. |
| 2015/0035680 | A1* | 2/2015 | Li ............................ G01K 1/14 340/584 |
| 2016/0128625 | A1* | 5/2016 | Lee ........................ A61B 5/117 600/509 |
| 2016/0324478 | A1* | 11/2016 | Goldstein ................ A61B 5/11 |
| 2017/0112671 | A1 | 4/2017 | Goldstein |
| 2017/0249445 | A1 | 8/2017 | DeVries et al. |
| 2017/0249823 | A1* | 8/2017 | Espinoza .......... G08B 21/0446 |
| 2017/0258329 | A1 | 9/2017 | Marsh |
| 2018/0317837 | A1 | 11/2018 | Burwinkel et al. |
| 2018/0323527 | A1 | 11/2018 | Ueda et al. |
| 2018/0343527 | A1 | 11/2018 | Edwards |
| 2019/0212198 | A1* | 7/2019 | Marsh .................... G01J 5/0011 |
| 2020/0268315 | A1 | 8/2020 | Burwinkel et al. |
| 2020/0352456 | A1* | 11/2020 | Joseph .................. A61B 5/486 |
| 2020/0367816 | A1 | 11/2020 | Panneer Selvam |
| 2020/0375532 | A1* | 12/2020 | Nath ...................... A61B 5/6803 |
| 2020/0397306 | A1 | 12/2020 | Frank et al. |
| 2021/0033586 | A1* | 2/2021 | Chadha .............. G01N 33/0065 |
| 2021/0137457 | A1* | 5/2021 | Matsumoto .......... A61B 5/4266 |
| 2021/0244365 | A1* | 8/2021 | Assouad ................ G16H 50/80 |
| 2022/0096318 | A1 | 3/2022 | Harper et al. |
| 2022/0301666 | A1* | 9/2022 | Shluzas .................... G06N 3/04 |
| 2023/0355174 | A1 | 11/2023 | Chen et al. |
| 2024/0041401 | A1 | 2/2024 | Reinhart et al. |

FOREIGN PATENT DOCUMENTS

| | | |
|---|---|---|
| WO | 2020060911 | 3/2020 |
| WO | 2022140559 | 6/2022 |

OTHER PUBLICATIONS

"International Preliminary Report on Patentability," for PCT Application No. PCT/US2021/064886 mailed Jul. 6, 2023 (13 pages).
"International Search Report and Written Opinion," for PCT Application No. PCT/US2021/064886 mailed Jun. 2, 2022 (19 pages).
"Invitation to Pay Additional Fees," for PCT Application No. PCT/US2021/064886 mailed Apr. 12, 2022 (12 pages).

Armstrong, L.E., et al. "Diagnosing dehydration? Blend evidence with clinical observations," Current Opinion in Clinical Nutrition & Metabolic Care, 2016, 19(6), 434-438 (15 pages).
Begum, M.N., et al. "A review of the literature on dehydration in the institutionalized elderly," e-SPEN, the European e-Journal of Clinical Nutrition and Metabolism, 2010, 5(1), e47-e53 (8 pages).
Burger, S., et al. "Malnutrition and dehydration in nursing homes: Key issues in prevention and treatment," National Citizens' Coalition for Nursing Home Reform, 2000, Washington, DC: Commonwealth Fund (55 pages).
Dhatariya, K. "People with type 1 diabetes using short acting analogue insulins are less dehydrated than those with using human soluble insulin prior to onset of diabetic ketoacidosis," Medical Hypothesis, 2008, 71(5), 706-708 (3 pages).
Ferry, M. "Strategies for ensuring good hydration in the elderly," Nutrition Reviews (2005), 63(suppl_1), s22-s29 (8 pages).
Hooper, L., et al. "Water-loss dehydration and aging," Mechanisms of Ageing and Development (2014), 136, 50-58 (11 pages).
Karagiannis, M.J., et al. "Effects of oral intake of water in patients with oropharyngeal dysphagia," BMC Geriatrics (2011), 11(1), 9 (11 pages).
Keller, U., et al. "Effects of changes in hydration on protein, glucose and lipid metabolism in man: impact on health," European Journal of Clinical Nutrition (2003) 57, Suppl2, S69-S74 (6 pages).
Kharicha, K., et al. "Health risk appraisal in older people 1: are older people living alone an 'at-risk' group?," Br J Gen Pract (2007), 57(537), 271-276 (6 pages).
Lorenzl, S., et al. "Acute confusional states in the elderly-diagnosis and treatment," Deutsches Ärzteblatt International (2012), 109(21), 391 (11 pages).
Marik, P.E., et al. "Aspiration pneumonia and dysphagia in the elderly," Chest (2003), 124(1), 328-336 (9 pages).
Mentes, J. "Oral Hydration in Older Adults: Greater awareness is needed in preventing, recognizing, and treating dehydration," AJN The American Journal of Nursing (2006), 106(6), 40-49 (40 pages).
Miskelly, F.G. "Assistive technology in elderly care," Age and Ageing (2001), 30(6), 455-458 (4 pages).
Peetoom, K.K., et al. "Literature review on monitoring technologies and their outcomes in independently living elderly people," Disability and Rehabilitation (2015), 10(4), 271-294 (24 pages).
Picetti, D., et al. "Hydration health literacy in the elderly," Nutrition and Healthy Aging (2017), 4(3), 227-237 (11 pages).
Reber, E., et al. "Management of dehydration in patients suffering swallowing difficulties," Journal of Clinical Medicine (2019), 8(11), 1923 (19 pages).
Schols, J.M., et al. "Preventing and treating dehydration in the elderly during periods of illness and warm weather," JNHA—The Journal of Nutrition, Health, and Aging (2009), 13(2), 150-157 (8 pages).
Shimizu, M., et al. "Physical signs of dehydration in the elderly," Internal Medicine (2012), 51(10), 1207-1210 (4 pages).
Silver, A.J. "Aging and risks for dehydration," Cleveland Clinic Journal of Medicine (1990), 57(4), 341-344 (4 pages).
Stookey, J.D., et al. "Is the prevalence of dehydration among community-dwelling older adults really low? Informing current debate over the fluid recommendation for adults aged 70+ years," Public health nutrition (2005), 8(8), 1275-1285 (12 pages).
Teno, J.M., et al. "Survival after multiple hospitalizations for infections and dehydration in nursing home residents with advanced cognitive impairment," JAMA (2013), 310(3) 319-320 (2 pages).
Vivanti, A., et al. "Clinical assessment of dehydration in older people admitted to hospital: what are the strongest indicators?" Archives of Gerontology and Geriatrics (2008), 47(3), 340-355 (16 pages).
"Non-Final Office Action," for U.S. Appl. No. 18/268,836 mailed Dec. 23, 2025 (23 pages).

* cited by examiner

EAR-WEARABLE SYSTEM AND METHOD FOR DETECTING HEAT STRESS, HEAT STROKE AND RELATED CONDITIONS

This application claims the benefit of U.S. Provisional Application No. 63/295,032, filed Dec. 30, 2021, the content of which is herein incorporated by reference in its entirety.

FIELD

Embodiments herein relate to ear-wearable systems and devices for detecting heat stress, heat stroke, and related conditions.

BACKGROUND

Heat stress, heat exhaustion, and heat stroke are an escalating set of health problems that occur when a person's body is unable to regulate its body temperature and it begins to reach dangerous levels.

Heat stress, heat exhaustion, and heat stroke represent a significant health issue, particularly amongst elderly people. While anyone can experience heat related conditions, older individuals are physiologically more susceptible due to changes in bodily fluid reserves, renal function, and thirst response. Older individuals also frequently have medical conditions and/or take medications that further make the susceptible. In some cases, individuals suffering from such heat related conditions are unable to detect their own symptoms and/or express that they are experiencing them within a time frame where interventions are maximally effective to prevent harm.

SUMMARY

Embodiments herein relate to ear-wearable systems and devices for detecting heat stress, heat stroke, and related conditions. In a first aspect, an ear-wearable heat stress risk assessment system can be included having a control circuit, a microphone, wherein the microphone can be in electrical communication with the control circuit, and a sensor package, wherein the sensor package can be in electrical communication with the control circuit. The system can be configured to process signals of one or more sensors of the sensor package and/or the microphone, detect dehydration symptoms, environmental conditions, and activity levels of a device wearer based on the processed signals, and determine a heat stress risk level based on detected dehydration symptoms, environmental conditions, activity levels of the device wearer, and a pre-existing health condition of the device wearer.

In a second aspect, in addition to one or more of the preceding or following aspects, or in the alternative to some aspects, the sensor package can include a temperature sensor.

In a third aspect, in addition to one or more of the preceding or following aspects, or in the alternative to some aspects, the sensor package can include at least one selected from the group consisting of a photoplethysmography sensor and a motion sensor.

In a fourth aspect, in addition to one or more of the preceding or following aspects, or in the alternative to some aspects, the sensor package can include at least one selected from the group consisting of a photoplethysmography (PPG) sensor, an electrocardiography (ECG) sensor, an electromyography (EMG) sensor, a motion sensor, an electroencephalography (EEG) sensor, and a glucose sensor.

In a fifth aspect, in addition to one or more of the preceding or following aspects, or in the alternative to some aspects, the dehydration symptoms include one or more of rapid shallow breathing, increased pulse, decreased blood pressure, dizziness, dry mouth, changes in voice quality, increased temperature, delirium, and increased glucose concentration.

In a sixth aspect, in addition to one or more of the preceding or following aspects, or in the alternative to some aspects, the sensor package can include a resistive sensor to measure salinity of a perspiration fluid.

In a seventh aspect, in addition to one or more of the preceding or following aspects, or in the alternative to some aspects, the system can be configured to receive data from at least one external sensor or external system.

In an eighth aspect, in addition to one or more of the preceding or following aspects, or in the alternative to some aspects, the external sensor can be selected from the group consisting of a humidity sensor, an ambient temperature sensor, an ambient light sensor, and a sensor disposed on a charging device for the system.

In a ninth aspect, in addition to one or more of the preceding or following aspects, or in the alternative to some aspects, the external system can be an HVAC system.

In a tenth aspect, in addition to one or more of the preceding or following aspects, or in the alternative to some aspects, the external system can be a weather information system.

In an eleventh aspect, in addition to one or more of the preceding or following aspects, or in the alternative to some aspects, the system can be configured to process signals of the microphone to detect signs of heat stress.

In a twelfth aspect, in addition to one or more of the preceding or following aspects, or in the alternative to some aspects, the signs of heat stress include an utterance or phrase matching at least one from a predetermined list of utterances and phrases.

In a thirteenth aspect, in addition to one or more of the preceding or following aspects, or in the alternative to some aspects, the system can be configured to issue an alert when the heat stress risk level crosses a threshold value.

In a fourteenth aspect, in addition to one or more of the preceding or following aspects, or in the alternative to some aspects, the threshold value can be dynamically set based on factors including one or more of an ambient temperature, an ambient humidity, activity levels of the device wearer, preexisting health conditions of the device wearer, and an estimated hydration level of the device wearer.

In a fifteenth aspect, in addition to one or more of the preceding or following aspects, or in the alternative to some aspects, the system can be configured to issue an alert when the heat stress risk level crosses a threshold value for at least a threshold period of time.

In a sixteenth aspect, in addition to one or more of the preceding or following aspects, or in the alternative to some aspects, the system can be configured to issue an alert with a suggested countermeasure when the heat stress risk level crosses a threshold value.

In a seventeenth aspect, in addition to one or more of the preceding or following aspects, or in the alternative to some aspects, the suggested countermeasure can include at least one of a suggestion to move to a cooler location, a suggestion to drink water, and a suggestion to reduce physical exertion.

In an eighteenth aspect, in addition to one or more of the preceding or following aspects, or in the alternative to some aspects, the system can be configured to issue a series of escalating alerts based on the heat stress risk level crossing a series of threshold values.

In a nineteenth aspect, in addition to one or more of the preceding or following aspects, or in the alternative to some aspects, the system can further include a first unit, wherein the first unit can be configured to be wearable about a first ear, and a second unit, wherein the second unit can be configured to be wearable about a second ear, wherein signals can be exchanged between the first unit and the second unit.

In a twentieth aspect, in addition to one or more of the preceding or following aspects, or in the alternative to some aspects, the system can be configured to classify an observed pattern representing signals from the microphone and the sensor package into categories of heat stress, heat exhaustion, or heat stroke using a machine learning derived algorithm.

In a twenty-first aspect, an ear-wearable heat stress detection system can be included having a control circuit, a microphone, wherein the microphone can be in electrical communication with the control circuit, and a sensor package, wherein the sensor package can be in electrical communication with the control circuit. The system can be configured to process signals of one or more sensors of the sensor package and/or the microphone to detect indications of heat stress, heat exhaustion, or heat stroke.

In a twenty-second aspect, in addition to one or more of the preceding or following aspects, or in the alternative to some aspects, the sensor package can include a temperature sensor.

In a twenty-third aspect, in addition to one or more of the preceding or following aspects, or in the alternative to some aspects, the sensor package can include at least one selected from the group consisting of a photoplethysmography sensor and a motion sensor.

In a twenty-fourth aspect, in addition to one or more of the preceding or following aspects, or in the alternative to some aspects, the sensor package can include at least one selected from the group consisting of a photoplethysmography (PPG) sensor, a electrocardiography (ECG) sensor, an electromyography (EMG) sensor, a motion sensor, an electroencephalography (EEG) sensor, and a glucose sensor.

In a twenty-fifth aspect, in addition to one or more of the preceding or following aspects, or in the alternative to some aspects, the system can be configured to process signals to detect indications of dehydration.

In a twenty-sixth aspect, in addition to one or more of the preceding or following aspects, or in the alternative to some aspects, the indications of dehydration include one or more of rapid shallow breathing, increased pulse, decreased blood pressure, dizziness, dry mouth, changes in voice quality, increased temperature, delirium, and increased glucose concentration.

In a twenty-seventh aspect, in addition to one or more of the preceding or following aspects, or in the alternative to some aspects, the sensor package can include a resistive sensor to measure salinity of a perspiration fluid.

In a twenty-eighth aspect, in addition to one or more of the preceding or following aspects, or in the alternative to some aspects, the system can be configured to receive data from at least one external sensor or external system.

In a twenty-ninth aspect, in addition to one or more of the preceding or following aspects, or in the alternative to some aspects, the external sensor can be selected from the group consisting of a humidity sensor, an ambient temperature sensor, an ambient light sensor, and a sensor disposed on a charging device for the system.

In a thirtieth aspect, in addition to one or more of the preceding or following aspects, or in the alternative to some aspects, the external system can be an HVAC system.

In a thirty-first aspect, in addition to one or more of the preceding or following aspects, or in the alternative to some aspects, the external system can be a weather information system.

In a thirty-second aspect, in addition to one or more of the preceding or following aspects, or in the alternative to some aspects, the system can be configured to process signals of the microphone to detect signs of heat exhaustion or heat stroke.

In a thirty-third aspect, in addition to one or more of the preceding or following aspects, or in the alternative to some aspects, the signs of heat exhaustion or heat stroke include an utterance or phrase matching at least one from a predetermined list of utterances and phrases.

In a thirty-fourth aspect, in addition to one or more of the preceding or following aspects, or in the alternative to some aspects, the system can be configured to issue an alert when heat exhaustion or heat stroke indications cross a threshold value.

In a thirty-fifth aspect, in addition to one or more of the preceding or following aspects, or in the alternative to some aspects, the threshold value can be dynamically set based on factors including one or more of an ambient temperature, an ambient humidity, activity levels of the device wearer, preexisting health conditions of the device wearer, and an estimated hydration level of the device wearer.

In a thirty-sixth aspect, in addition to one or more of the preceding or following aspects, or in the alternative to some aspects, the system can be configured to issue an alert when heat exhaustion or heat stroke indications cross a threshold value for at least a threshold period of time.

In a thirty-seventh aspect, in addition to one or more of the preceding or following aspects, or in the alternative to some aspects, the system can be configured to issue an alert with a suggested countermeasure when heat exhaustion or heat stroke indications cross a threshold value.

In a thirty-eighth aspect, in addition to one or more of the preceding or following aspects, or in the alternative to some aspects, the suggested countermeasure can include at least one of a suggestion to move to a cooler location, a suggestion to drink water, and a suggestion to reduce physical exertion.

In a thirty-ninth aspect, in addition to one or more of the preceding or following aspects, or in the alternative to some aspects, the system can be configured to issue a series of escalating alerts based on heat exhaustion or heat stroke indications crossing a series of threshold values.

In a fortieth aspect, in addition to one or more of the preceding or following aspects, or in the alternative to some aspects, the system can further include a first unit, wherein the first unit can be configured to be wearable about a first ear, and a second unit, wherein the second unit can be configured to be wearable about a second ear, wherein signals can be exchanged between the first unit and the second unit.

In a forty-first aspect, in addition to one or more of the preceding or following aspects, or in the alternative to some aspects, the system can be configured to classify an observed pattern representing signals from the microphone and the sensor package into categories of heat exhaustion or heat stroke using a machine learning derived algorithm.

In a forty-second aspect, a method of assessing heat stress risk for a device wearer can be included. The method can include processing signals of one or more sensors of a sensor package and/or a microphone of an ear-wearable device, detecting dehydration symptoms, environmental conditions, and activity levels of the device wearer based on the processed signals, and determining a heat stress risk level based on detected dehydration symptoms, environmental conditions, and activity levels of the device wearer.

In a forty-third aspect, in addition to one or more of the preceding or following aspects, or in the alternative to some aspects, the method can further include receiving data from at least one external sensor or external system.

In a forty-fourth aspect, in addition to one or more of the preceding or following aspects, or in the alternative to some aspects, the method can further include processing signals of the microphone to detect signs of heat stress.

In a forty-fifth aspect, in addition to one or more of the preceding or following aspects, or in the alternative to some aspects, the method can further include issuing an alert when the heat stress risk level crosses a threshold value.

In a forty-sixth aspect, in addition to one or more of the preceding or following aspects, or in the alternative to some aspects, the method can further include issuing an alert when the heat stress risk level crosses a threshold value for at least a threshold period of time.

In a forty-seventh aspect, in addition to one or more of the preceding or following aspects, or in the alternative to some aspects, the method can further include issuing an alert with a suggested countermeasure when the heat stress risk level crosses a threshold value.

In a forty-eighth aspect, in addition to one or more of the preceding or following aspects, or in the alternative to some aspects, the method can further include issuing a series of escalating alerts based on the heat stress risk level crossing a series of threshold values.

In a forty-ninth aspect, in addition to one or more of the preceding or following aspects, or in the alternative to some aspects, the method can further include classifying an observed pattern representing signals from the microphone and the sensor package into categories of heat stress, heat exhaustion, or heat stroke using a machine learning derived algorithm.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
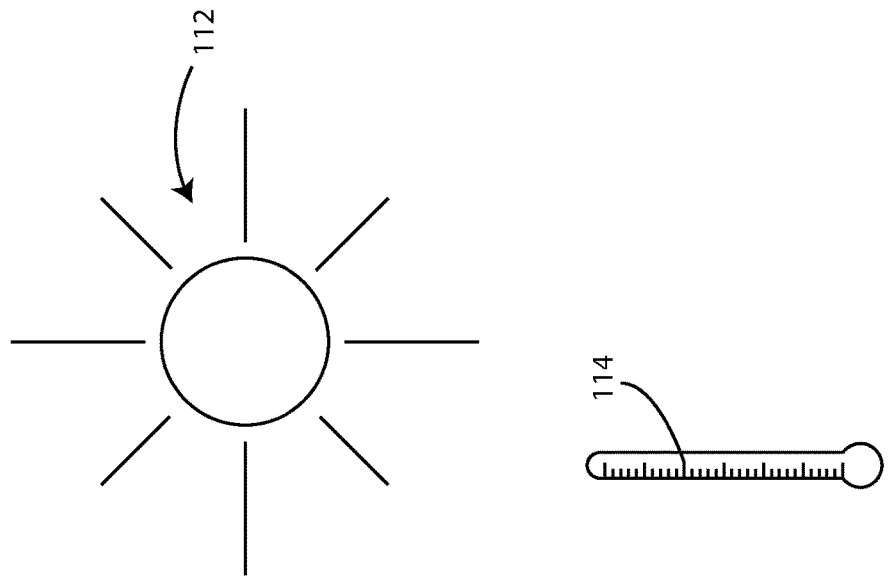
FIG. 1 is a schematic view of an ear-wearable monitoring device and a device wearer in accordance with various embodiments herein.
Figure 1:
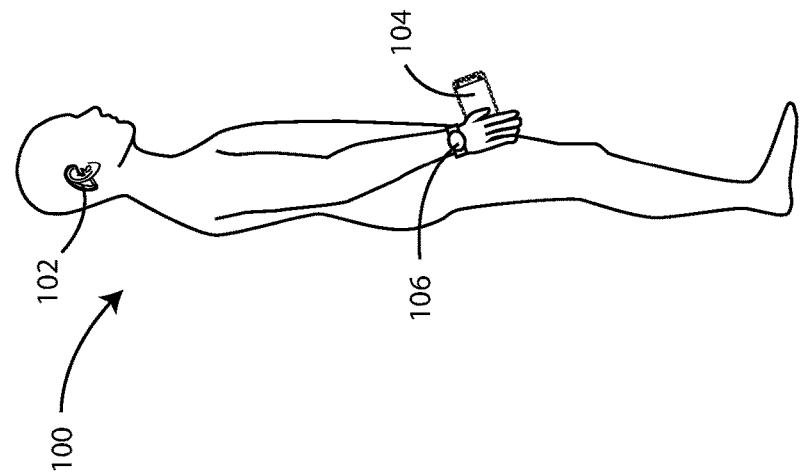

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, heat-related conditions such as heat stress, heat exhaustion, and heat stroke represent a significant health issue. This is particularly true among elderly people as they are physiologically more susceptible to heat conditions due to changes in bodily fluid reserves, renal function, thirst response, and perception of symptoms.

Systems and devices herein can automatically assess physical status to detect heat conditions and notify the individual experiencing heat conditions and/or a caregiver. This monitoring technology can provide benefits for users across all age groups. However, this monitoring technology can provide particular benefits for the elderly including prolonging how long elderly individuals are able to live independently and/or improving the quality of care received by individuals residing in assisted living.

Dehydration, certain environmental conditions, and high activity levels can all put an individual at high risk for heat stress and related conditions. Systems herein can process signals of one or more sensors or a microphone to detect dehydration symptoms, environmental conditions, and/or activity levels of the device wearer based on the signals and determine a heat stress risk level.

Dehydration or hydration levels can be determined in various ways. In some embodiments, systems herein can include an ear-wearable device including a sensor package containing various sensors, such as microphone, photoplethysmography (PPG) sensor, electrocardiography (ECG) sensor, temperature sensor, electromyography (EMG) sensor, inertial measurement unit (IMU) sensor, electroencephalography (EEG) sensor, and glucose sensor, amongst others. These sensors can be used individually or in conjunction to detect symptoms of dehydration (including, but not limited to, increased temperature, increased pulse, rapid/shallow breathing, low blood pressure, dizziness, dry mouth, change in voice quality, delirium, and increased glucose concentration). For example, rapid, shallow breathing may be detected acoustically via microphone or by monitoring respiratory sinus arrhythmia via ECG or PPG. A single sensor can be used to detect multiple symptoms. For example, the microphone can detect a change in vocal quality in addition to detecting rapid, shallow breathing. In some embodiments, the system can receive inputs regarding dehydration or hydration levels, such as from a system user or from a separate system.

Device and systems herein can also detect environmental conditions for evaluation in considering heat stress risks. Environmental conditions can be determined through sensors such as ambient temperature sensors, humidity sensors, and ambient light sensors and the like. Alternatively, or in addition, the devices or systems herein can receive an input regarding environmental conditions. For example, the devices or systems herein can receive information regarding environmental conditions from a user input, a weather API, an HVAC system, a weather information system, or another system. In some embodiments, the environmental conditions can be evaluated as a continuous variable. In some embodiments, the environmental conditions can be evaluated as discrete variables.

Device and systems herein can also detect activity levels for evaluation in considering heat stress risks. Activity levels can be determined using various sensor signals described herein including, for example, motion sensor signals. Physical activity generates characteristic motion sensor signal patterns that can be identified by the system. In some embodiments, the motion sensor can include an accelerometer and values associated with signals thereof (such as one or more of average values, standard deviation values, variance values, root mean square values, or power values), which can be correlated with activity levels, can be used to estimate activity levels. Other sensor signals can also be used to determine activity levels.

As used herein, the terms "heat condition" and "heat stress" shall both include reference to heat stress, heat exhaustion, and heat stroke, unless the context dictates otherwise.

Additional aspects of embodiments herein can include long-term tracking and personalized condition determination on an ear-wearable platform. Personalized baselines can be established herein to more accurately identify abnormal conditions. For example, normal core body temperatures for individuals can vary from 97 to 99 degrees Fahrenheit, the commonly quoted temperature of 98.6 degrees Fahrenheit being normal. Thus, for some individuals, a measured core temperature of 99 degrees Fahrenheit may represent an increased core body temperature, but for others it may only represent a normal core body temperature. Therefore, a universal absolute threshold for detecting heat condition symptoms is unlikely to work across population. With an ear-wearable device that is worn every day over long periods of time, individualized baselines can be established and provide more accurate and personalized heat condition alerts. In some embodiments, the system can accept an input regarding a normal core body temperature for the device wearer. In other embodiments, the system can monitor temperature over a learning or training period to automatically determine normal core body temperature for the device wearer to establish a baseline value.

Establishing baseline values can also be important for other parameters used herein to identify heat stress or related heat conditions. For example, a resting heart rate of 70 bpm may be clinically considered as normal, but for a trained athlete with normal resting heart rate of 50 bpm, a 70 bpm HR should be considered as elevated. In the case of blood pressure, many hypertensive patients may go through their day with systolic pressure above 140 mmHg. As such, devices and systems herein can determine and/or receive input on individualized baselines on a variety of parameters to provide more accurate and personalized heat condition alerts.

Referring now to FIG. 1, a schematic view of an ear-wearable monitoring device 102 and a device wearer 100 is shown in accordance with various embodiments herein. The weather 112, and specifically the temperature 114, amount of sunlight, and humidity, experienced by the device wearer 100 will impact heat stress on the device wearer (with high humidity reducing the effectiveness of cooling through sweating). This can occur even if the device wearer 100 is substantially sedentary. Thus, environmental conditions (outdoors or indoors) can play a role in the development of heat stress. In this view, the device wearer 100 is shown wearing an ear-wearable monitoring device 102. In accordance with embodiments herein, the ear-wearable monitoring device 102 can be used to monitor wearers of the system/device for possible symptoms of heat stress. In some embodiments, the ear-wearable monitoring device 102 can also work in combination with other devices. For example, in FIG. 1 the device wearer 100 is also depicted with an accessory device 104 and a separate wearable device 106. In some embodiments, these other devices can be used to provide additional data (such as based on sensors that are part of the other devices, such as an ambient light sensor on the accessory device) for analysis and/or can used to convey alerts or information regarding the possible detection of heat stress or other heat related conditions.

Figure 2:
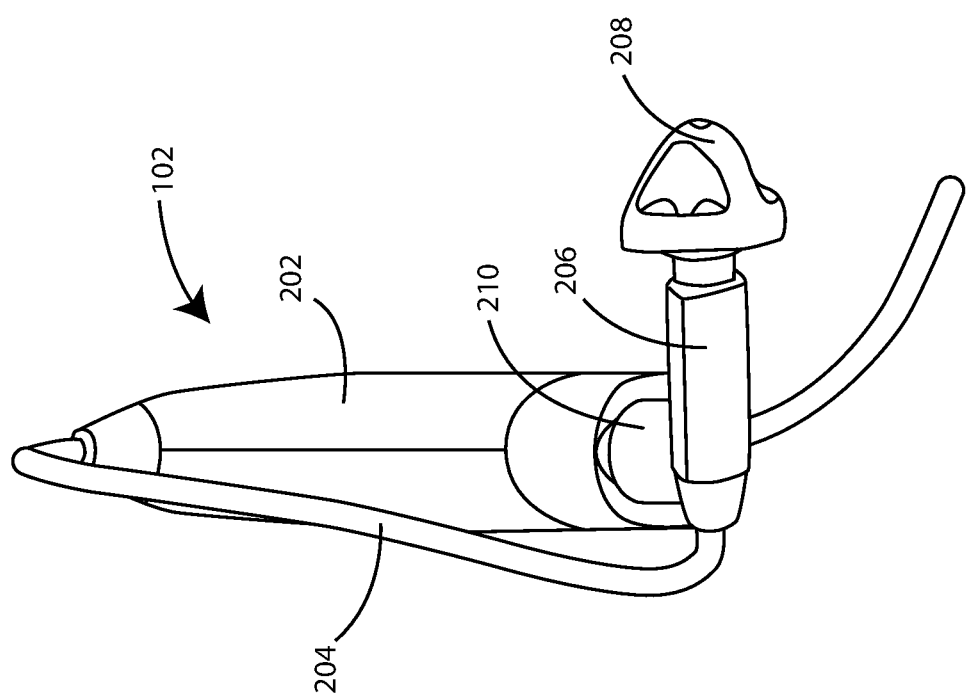
FIG. 2 is a schematic view of an ear-wearable monitoring device in accordance with various embodiments herein.

Ear-wearable devices herein can take on many different specific forms. Referring now to FIG. 2, a schematic view of an example of an ear-wearable monitoring device 102 is shown in accordance with various embodiments herein. The ear-wearable monitoring device 102 can include a housing 202, a cable 204, a receiver 206, a cone 208, and a battery compartment 210, amongst other things.

In various embodiments, the ear-wearable monitoring device 102 can include a control circuit, a microphone in electrical communication with the control circuit, a power supply in electrical communication with the control circuit, and a sensor package. The sensor package can include various sensors as described further below. The ear-wearable monitoring device 102 can be configured to process signals of one or more sensors of the sensor package to detect various clinical symptoms of heat stress. In various embodiments, the ear-wearable monitoring device 102 can also be configured to process signals of the microphone to detect signs of heat stress.

In various embodiments, the ear-wearable monitoring device 102 can be configured to issue an alert when heat stress symptoms cross a threshold value. In some cases, the threshold can be preset, such as programmed in by a system user or a clinician. However, in some embodiments, the threshold value can be dynamically set based on factors including one or more of an ambient temperature, an ambient humidity, activity levels of the device wearer, preexisting health conditions of the device wearer, and an estimated hydration level of the device wearer. In various embodiments, the ear-wearable monitoring device 102 can be configured to issue an alert when heat stress symptoms cross a threshold value and are sustained for at least a threshold period of time. In some embodiments, the system can be configured to issue an alert with a suggested countermeasure when the heat stress risk level crosses a threshold value. In some embodiments, the system can be configured to issue a series of escalating alerts based on the heat stress risk level crossing a series of threshold values.

As an approach to prevent heat stress, in some embodiments the system can utilize a timer to track how long a device wearer has been exerting themselves. For example, in some embodiments, the time can be automatically started when the system detects activity levels exceeding a threshold value (such as detecting motion sensor signals indicative of exercise). Also, a target value of exertion or exercise time can be set, such as input by a clinician or a system user. The target value could be 5, 10, 15, 20, 30, 45, or 60 minutes or more, or an amount of time falling within a range between any of the foregoing. Then, if the system detects that the threshold has been exceeded using the timer, the system can be configured to prompt the user to stop exercising, take a break, drink some water, or take another countermeasure.

Figure 3:
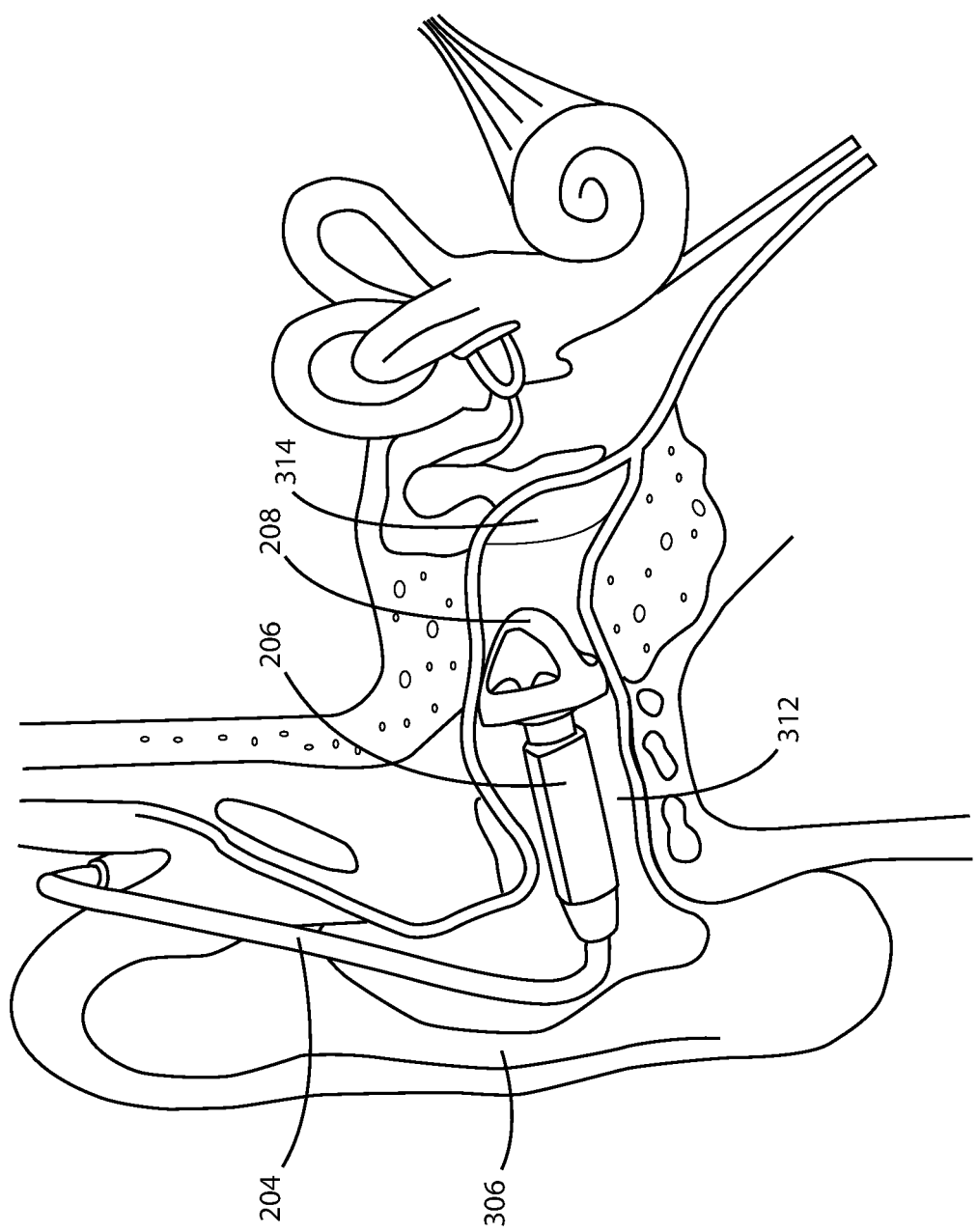
FIG. 3 is a schematic view of an ear-wearable monitoring device within an ear of a device wearer in accordance with various embodiments herein.

Ear-wearable devices herein can be worn on or in the ear. For example, referring now to FIG. 3, a schematic view of an ear-wearable monitoring device is shown within an ear of a device wearer 100 in accordance with various embodiments herein. FIG. 3 shows the external ear 306, the external auditory canal 312 and the tympanic membrane 314. Portions of the ear-wearable device are visible including a cable 204 connecting to a receiver 206 and a cone 208 disposed on the end thereof.

Figure 4:
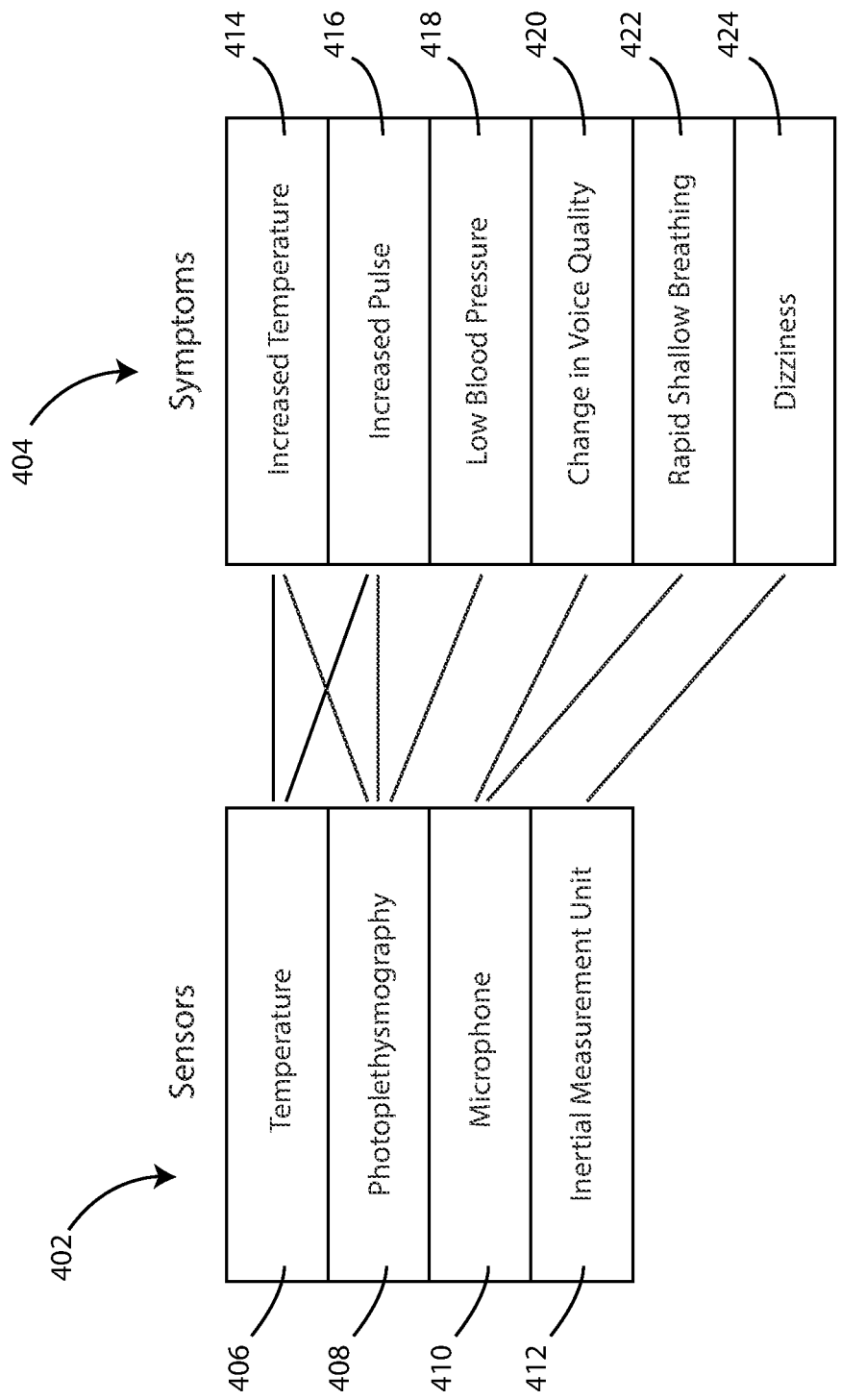
FIG. 4 is a block diagram illustrating sensors and symptoms they can detect in accordance with various embodiments herein.

It will be appreciated that many different sensors can be included with embodiments herein and can detect various clinical symptoms of heat stress and/or dehydration. Referring now to FIG. 4, a block diagram illustrating sensors and symptoms is shown in accordance with various embodiments herein. In specific, FIG. 4 shows some exemplary sensors of a sensor package 402. The sensor package 402 can be configured to include various sets of sensors, depending on the specific embodiment. Thus, a sensor package 402 in accordance with embodiments herein can include one, two, three, or four of the sensors shown in FIG. 4.

In this particular example, the sensor package 402 includes a temperature sensor 406 (which could be a core temperature sensor), a photoplethysmography sensor 408, a microphone 410, and a motion sensor 412 (such as an IMU). FIG. 4 also shows clinical symptoms of heat stress 404 that can be detected using these sensors as illustrated by the lines connecting sensors and symptoms. The clinical symptoms 404 of heat stress and/or dehydration can include an increased temperature 414, an increased pulse rate 416, a low blood pressure 418, a change in voice quality 420, a rapid shallow breathing 422, dizziness 424, and the like.

While a normal breathing rate will be different for each individual, breathing rates amongst an elderly set of patients can be from 12 to 18 breaths per minute for those living independently and 16 to 25 breaths per minute for those in long term-care. Further, while a normal pulse rate can depend on various factors, a normal pulse rate amongst the elderly can be from 60 to 100 beats per minute. Similarly, while a normal blood pressure for an individual can depend on various factors, a normal blood pressure is generally less than 120/80.

However, for most of the clinical symptoms of heat stress and/or dehydration, it is particularly valuable to understand what normal values are for a given patient. As such, embodiments herein can detect such values and establish a baseline value for an individual over a period of time. For example, systems and/or devices herein can monitor data over time periods of hours, days, weeks, months or years in order to derive a baseline value for any of the measures that can serve as signs of heat stress. In some embodiments, the baseline value can be a moving average value of any of the measures or any combination thereof. In some embodiments, the baseline value can be a statistical measure. In some embodiments, the baseline value can account for diurnal cycles. For example, blood pressure typically rises sharply on waking in the morning and falls during sleep at night.

Thus, in various embodiments herein, symptoms of heat stress and/or dehydration herein can include one or more of in increased rate of breathing over a baseline value, an increased pulse rate over a baseline value, a decreased blood pressure over a baseline value, an increased temperature over a baseline value, and/or an increase in dizziness or unsteadiness over a baseline value.

Changes in voice quality can also be a sign of heat stress and/or dehydration. Voice quality can be assessed by capturing an individual's voice using a microphone. The signals from the microphone can then be processed using analog and/or digital signal processing techniques. As such, in various embodiments herein, an ear-wearable device can be configured to detect signs of heat stress including changes in voice pitch (typically a lowered pitch/frequency associated with hoarseness) and tremor (e.g., a quavering of the voice). In various embodiments herein, an ear-wearable device can be configured to detect signs of heat stress including dysphonia (hoarseness).

In some embodiments, the signs of heat stress detectable with microphone signals herein includes detecting an utterance or phrase matching at least one from a predetermined list of utterances and phrases. For example, the system can detect the device wearer uttering a phrase such as "phew", "it's so hot out", or "I feel so fried", which can each serve as a marker that the device wearer is experiencing symptoms of heat stress or at risk of heat stress.

In various embodiments, the ear-wearable device or system can distinguish between speech or sounds associated with the device wearer and speech or sounds associated with a third party. This can be useful to be sure that detected changes in voice quality actually relate to the device wearer instead of another nearby individual.

Distinguishing between speech or sounds associated with the device wearer and speech or sounds associated with a third party can be performed in various ways. In some embodiments, this can be performed through signal analysis of the signals generated from the microphone(s). For example, in some embodiments, this can be done by filtering out frequencies of sound that are not associated with speech of the device-wearer. In some embodiments, such as where there are two or more microphones (on the same ear-wearable device or on different ear-wearable devices) this can be done through spatial localization of the origin of the speech or other sounds and filtering out, spectrally subtracting, or otherwise discarding sounds that do not have an origin within the device wearer. In some embodiments, such as where there are two or more ear-worn devices, own-voice detection can be performed and/or enhanced through correlation or matching of intensity levels and or timing.

In some cases, the system can include a bone conduction microphone in order to preferentially pickup the voice of the device wearer. In some cases, the system can include a directional microphone that is configured to preferentially pickup the voice of the device wearer. In some cases the system can include an intracanal microphone (a microphone configured to be disposed within the ear-canal of the device wearer) to preferentially pickup the voice of the device wearer. In some cases, the system can include a motion sensor (e.g., an accelerometer configured to be on or about the head of the wearer) to preferentially pick up skull vibrations associated with the vocal productions of the device wearer.

In some cases, an adaptive filtering approach can be used. By way of example, a desired signal for an adaptive filter can be taken from a first microphone and the input signal to the adaptive filter is taken from the second microphone. If the hearing aid wearer is talking, the adaptive filter models the relative transfer function between the microphones. Own-voice detection can be performed by comparing the power of an error signal produced by the adaptive filter to the power of the signal from the standard microphone and/or looking at the peak strength in the impulse response of the filter. The amplitude of the impulse response should be in a certain range in order to be valid for the own voice. If the user's own voice is present, the power of the error signal will be much less than the power of the signal from the standard microphone, and the impulse response has a strong peak with an amplitude above a threshold. In the presence of the user's own voice, the largest coefficient of the adaptive filter is expected to be within a particular range. Sound from other noise sources results in a smaller difference between the power of the error signal and the power of the signal from the standard microphone, and a small impulse response of the filter with no distinctive peak. Further aspects of this approach are described in U.S. Pat. No. 9,219,964, the content of which is herein incorporated by reference.

In another approach, a system herein can use a set of signals from a number of microphones. For example, a first microphone can produce a first output signal A from a filter and a second microphone can produce a second output signal B from a filter. The apparatus includes a first directional filter adapted to receive the first output signal A and produce a first directional output signal. A digital signal processor is adapted to receive signals representative of the sounds from the user's mouth from at least one or more of the first and second microphones and to detect at least an average fundamental frequency of voice (pitch output) $F_0$. A voice detection circuit is adapted to receive the second output signal B and the pitch output $F_0$ and to produce an own voice detection trigger T. The apparatus further includes a mismatch filter adapted to receive and process the second output signal B, the own voice detection trigger T, and an error signal E, where the error signal E is a difference between the first output signal A and an output O of the mismatch filter. A second directional filter is adapted to receive the matched output O and produce a second directional output signal. A first summing circuit is adapted to receive the first directional output signal and the second directional output signal and to provide a summed directional output signal (D). In use, at least the first microphone and the second microphone are in relatively constant spatial position with respect to the user's mouth, according to various embodiments. Further aspects of this approach are described in U.S. Pat. No. 9,210,518, the content of which is herein incorporated by reference.

In various embodiments, the ear-wearable monitoring system (described further below) can be configured to classify an observed pattern representing signals from the microphone 410 and the sensor package 402 into a scale of heat stress severities using a machine learning derived algorithm. By way of example, heat stress can be classified into mild heat stress, moderate heat stress, and severe heat stress. In some embodiments, machine learning analysis (such as the use of a machine learning classification algorithm) can be used to evaluate current clinical measures of heat stress (including any of those mentioned herein) and classify the same as being evidence of mild heat stress, moderate heat stress, and severe heat stress.

In various embodiments herein, one or more sensors can be operatively connected to a controller (such as a control circuit described further below) or another processing resource (such as a processor of another device or a processing resource in the cloud). The controller or other processing resource can be adapted to receive data representative of a characteristic of the subject from one or more of the sensors and/or determine statistics of the subject over a monitoring time period based upon the data received from the sensor. As used herein, the term "data" can include a single datum or a plurality of data values or statistics. The term "statistics" can include any appropriate mathematical calculation or metric relative to data interpretation, e.g., probability, confidence interval, distribution, range, or the like. Further, as used herein, the term "monitoring time period" means a period of time over which characteristics of the subject are measured and statistics are determined. The monitoring time period can be any suitable length of time, e.g., 1 millisecond, 1 second, 10 seconds, 30 seconds, 1 minute, 10 minutes, 30 minutes, 1 hour, 1 day, 1 week, etc., or a range of time between any of the foregoing time periods.

Any suitable technique or techniques can be utilized to determine statistics for the various data from the sensors, e.g., direct statistical analyses of time series data from the sensors, differential statistics, comparisons to baseline or statistical models of similar data, etc. Such techniques can be general or individual-specific and represent long-term or short-term behavior. These techniques could include standard pattern classification methods such as Gaussian mixture models, clustering as well as Bayesian approaches, neural network models and deep learning.

Further, in some embodiments, the controller can be adapted to compare data, data features, and/or statistics against various other patterns, which could be prerecorded patterns (baseline patterns) of the particular individual wearing an ear-wearable device herein, prerecorded patterns (group baseline patterns) of a group of individuals wearing ear-wearable devices herein, one or more predetermined patterns that serve as patterns indicative of heat stress (positive example patterns), one or more predetermined patterns that service as patterns indicative of the absence of heat stress (negative example patterns), or the like. As merely one scenario, if a pattern is detected in an individual that exhibits similarity crossing a threshold value to a positive example pattern or substantial similarity to that pattern, then that can be taken as an indication of an occurrence of heat stress.

Similarity and dissimilarity can be measured directly via standard statistical metrics such normalized Z-score, or similar multidimensional distance measures (e.g. Mahalanobis or Bhattacharyya distance metrics), or through similarities of modeled data and machine learning. These techniques can include standard pattern classification methods such as Gaussian mixture models, clustering as well as Bayesian approaches, neural network models, and deep learning.

As used herein the term "substantially similar" means that, upon comparison, the sensor data are congruent or have statistics fitting the same statistical model, each with an acceptable degree of confidence. The threshold for the acceptability of a confidence statistic may vary depending upon the subject, sensor, sensor arrangement, type of data, context, condition, etc.

The statistics associated with the health status of an individual (and, in particular, their status with respect to heat stress), over the monitoring time period, can be determined by utilizing any suitable technique or techniques, e.g., standard pattern classification methods such as Gaussian mixture models, clustering, hidden Markov models, as well as Bayesian approaches, neural network models, and deep learning.

Beyond changes in voice quality, microphones herein can be used to detect other occurrences that can be indicative of heat stress. By way of example, in various embodiments, the signs of heat stress include can include smacking or licking lips. The smacking or licking of lips result in unique aural signatures/patterns that can be detected by evaluating the signals from a microphone herein using analog and/or digital signal processing techniques and techniques such as pattern matching approaches described in greater detail below.

In various embodiments, the ear-wearable monitoring system can be configured to issue an alert, notification, or warning when heat stress risk and/or symptoms cross a threshold value. Alerts, notifications, and warnings can take various forms including audio notifications such as warning sounds or warning messages delivered by the ear-wearable device or another device, visual notifications such as notification messages on an accessory device, network delivered notifications, haptic notifications, and the like.

High ambient temperature (such as above 75, 80, 85, or 90 degrees Fahrenheit), high humidity (such as above 80, 85, or 90 percent relative humidity), and high or above average activity of the device wearer can all create conditions where water loss can be particularly rapid. As such, in some embodiments, the risk of heat stress can be particularly acute when high ambient temperature, high humidity, and/or high activity levels are detected. In response to such elevated risk, in various embodiments herein, a threshold value for issuing an alert, notification, or warning can be dynamically set based on factors including one or more of an ambient temperature 114, an ambient humidity, and activity levels of the device wearer 100. In various embodiments, the threshold value can be lowered (e.g., the sensitivity of detection can be increased) under such conditions so that an alert can be sent sufficiently early to mitigate the onset and effects of heat stress.

In some embodiments, a system herein can also include and/or utilize an accessory device. The accessory device can be used for various purposes. In some embodiments, the accessory device can be used to provide data from additional sensors that may be a part of the accessory device.

In various embodiments herein, the ear-wearable monitoring system can be configured to receive data from at least one external sensor or external source. In various embodiments herein, the external sensor can be including at least one of a humidity sensor, an ambient temperature sensor, an ambient light sensor, a weight sensor, and a sensor disposed on a charging device for the ear-wearable monitoring system. External sources can include, for example, things such as a source of weather information (such as a weather API), an electronic medical record, or the like.

In some embodiments, an accessory device (such as a smart phone) can be used to provide instructions or recommendations to the device wearer, such as instructions for mitigating a detected state of heat stress. In some embodiments, the accessory device can be used to provide instructions or recommendations to a care provider or health professional, such as instructions for mitigating a detected risk or state of heat stress.

Figure 5:
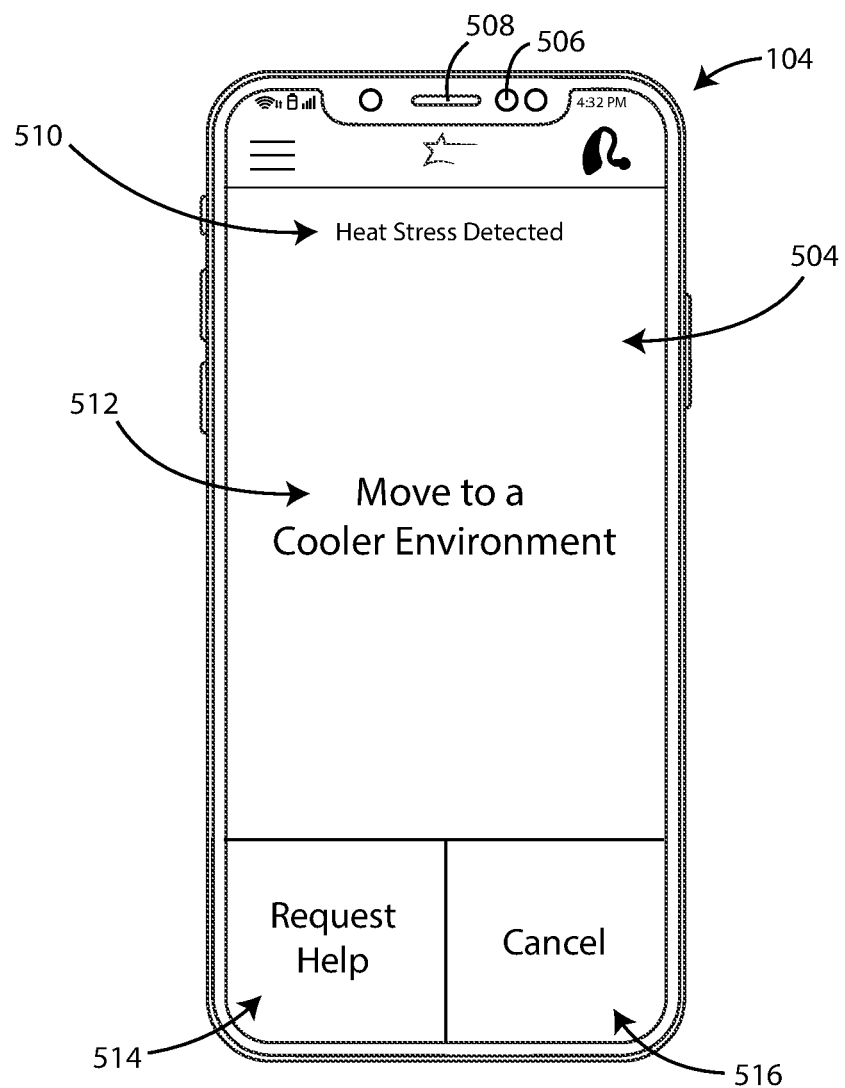
FIG. 5 is a schematic view of an accessory device in accordance with various embodiments herein.

Referring now to FIG. 5, a schematic view of an accessory device 104 is shown in accordance with various embodiments herein. The accessory device 104 includes a display screen 504. The accessory device 104 also includes a camera 506 and a speaker 508. The accessory device 104 also shows a notification 510. In this case, the notification 510 states that a state of heat stress has been detected. The accessory device 104 also includes a suggested action 512. In this case, the suggested action 512 is to move to a cooler environment, like indoors. However, other suggested actions can include, but are not limited to, drinking water, getting out of the sun, seeking assistance and the like.

In some embodiments, the accessory device 104 can display a query for the device wearer or a message that otherwise solicits or offers a chance for user input. In various embodiments herein where the accessory device 104 includes a speaker, it can also provide audible queries. As an example of a query, the system can seek confirmation of a likely instance of heat stress by querying the device wearer with a question such as "do you feel hot"? In some embodiments, the system can offer assistance such as by providing an input option that can be clicked on that says "Request Help" or something similar. As such, in some embodiments, the accessory device 104 also includes a first user input element 514 and/or a second user input element 516 by which user input can be received. However, it will be appreciated that user input can also be provided in other ways such as by receiving spoken commands from the device wearer or another individual.

Figure 6:
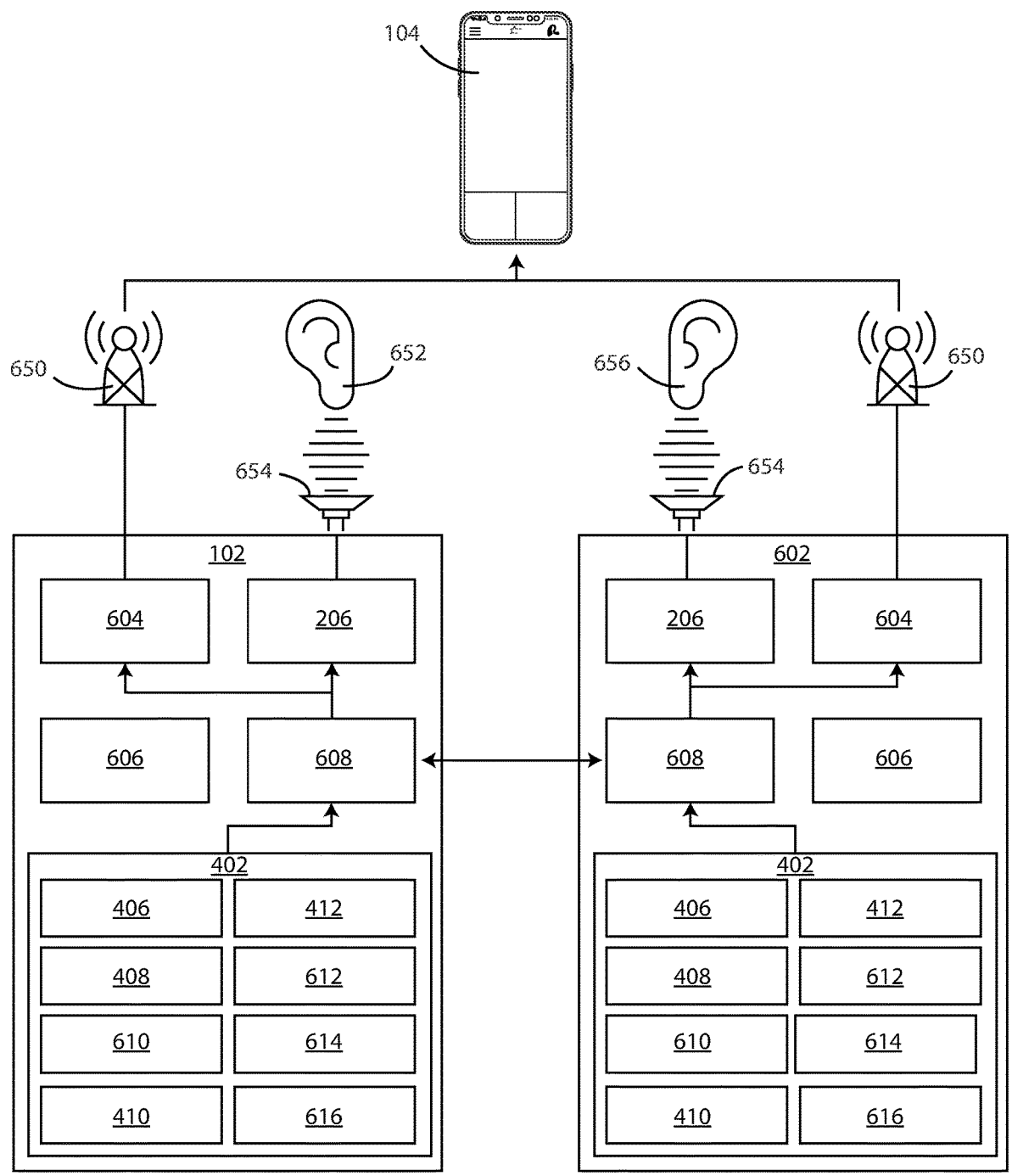
FIG. 6 is a schematic view of an ear-wearable monitoring system in accordance with various embodiments herein.

Ear-wearable monitoring devices and/or systems herein can include many different components. Referring now to FIG. 6, a schematic view of an ear-wearable monitoring system is shown in accordance with various embodiments herein. In this embodiment, the system includes a first ear-wearable device 102 and a second ear-wearable device 602. The first ear-wearable device 102 and be disposed on or within a first ear 652 and the second ear-wearable device 602 can be disposed on or within a second ear 656.

The ear-wearable devices 102, 602 can include various components such as a receiver 206 and a microphone 410. The ear-wearable devices 102, 602 can also include a data store containing a data log 604. The ear-wearable devices 102, 602 also includes a battery 606. The ear-wearable devices 102, 602 also includes a machine learning processing unit 608. The machine learning processing unit can include components such as those described with respect to a control circuit herein. The machine learning processing unit can function to execute machine learning algorithms on data provided by the sensors and/or utilize patterns and/or algorithms derived using machine learning analysis with respect to the sensor data.

The ear-wearable devices 102, 602 can also include an antenna 650 and an electroacoustic transducer 654 (sometimes referred to as a receiver). In many cases, the antenna 650 can be contained with the housing of the device. The devices 102, 602 can use the antenna 650 or another structure to be in wireless communication with one another and/or with accessory devices and the like. In some cases, processing loads can be distributed between multiple devices. For example, machine learning processing units 608 in each device can exchange data and function together. However, in some embodiments, the machine learning processing units 608 can function redundantly.

The ear-wearable devices 102, 602 include a microphone and a sensor package 402 that can include a photoplethysmography sensor 408, a temperature sensor 406, a motion sensor 412 (such as a motion sensor including an IMU), an electrocardiography sensor 610, an electromyography sensor 612, an electroencephalography sensor 614, and/or a glucose sensor 616. In this embodiment, the ear-wearable monitoring system also includes an accessory device 104 (such as a smartphone or other computing device).

A sudden change in external or ambient temperature can indicate that the device wearer is leaving indoors and going outdoors or vice versa. In some embodiments herein, if the system detects a sudden change (such as a temperature change exceeding 5, 10, or 15 degrees Fahrenheit or more, or a range between any of the foregoing, over a time period of less than 5, 3, 2, or 1 minutes) it can prompt the ear-wearable device to "look back" at the device wearer's condition (as evidenced by sensor and/or other measures herein such as hydration, glucose levels, etc.) to determine how at risk they are for heat stress. If the device determines the risk exceeds a threshold value, it can be configured to prompt the user to go back inside, drink some water, or take another countermeasure.

Once heat stress is detected, the system can notify the device wearer by relaying a notification acoustically via a receiver in the ear or electronically to an accessory or monitoring device with wireless capability (e.g., smartphone, smartwatch, tablet, computer, etc.). Electronic notification can be transmitted to the device wearer's accessory device or a monitoring device of a personal (e.g., family member) or professional (e.g., assisted living staff) caretaker.

In various embodiments, the ear-wearable monitoring system (described further below) can be configured to classify an observed pattern representing signals from the microphone 410 and the sensor package 402 into a scale of heat stress severities using a machine learning derived algorithm. In some embodiments, the scale can include 2, 3, 4, 5, 6, 7, 8, 9 or more levels on the scale of severities.

Figure 7:
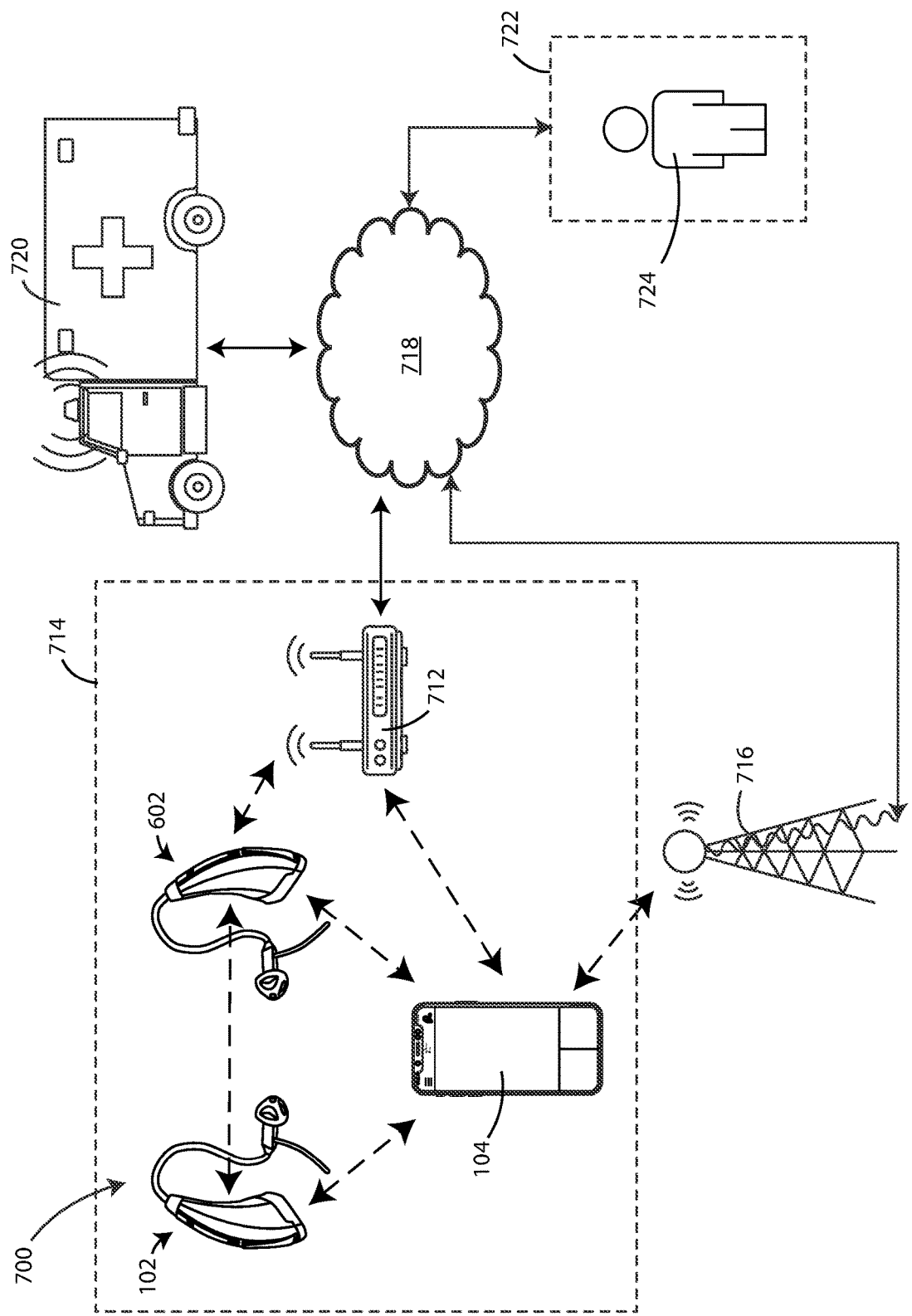
FIG. 7 is a schematic view of an ear-wearable monitoring system in accordance with various embodiments herein.

Referring now to FIG. 7, a schematic view of an ear-wearable monitoring system 700 is shown in accordance with various embodiments herein. The ear-wearable monitoring system 700 can include a first ear-wearable device 102, an accessory device 104, and a second ear-wearable device 602. In various embodiments, the first ear-wearable device 102, an accessory device 104, and a second ear-wearable device 602 can all be at a first location 714 where the device wearer is located. Signals from various components of the system and/or notifications can be conveyed remotely such as to and/or through the cloud 718. For example, the first location 714 can include a network router 712 that can serve as a gateway for network communication. FIG. 7 also shows a cell tower 716 can be used to exchange signals with the accessory device 104 and/or the ear-wearable devices. Signals and/or notifications conveyed remotely can be directed to different parties. FIG. 7 shows a second location 722 and a care provider 724 (such as a clinician or a designated third party) at the second location 722. Commonly, notifications herein can be directed to the care provider 724 whether the care provider 724 is at the first location 714 or the second location 722.

In some embodiments, the notifications can be directed to receive a more timely and serious response. For example, FIG. 7 shows an emergency responder 720. In cases of extreme heat stress risk, a notification can be sent directly to the emergency responder 720 to request their assistance. For example, if a measured temperature (such as a core temperature) crosses a threshold value then a notification can be sent directly to the emergency responder 720 to request their assistance. In various embodiments, the threshold value can be set by the device wearer, a care provider, or a clinician. In some embodiments, the threshold value can be programmed into the device or system. Exemplary threshold values can include 100, 101, 102, 103, 104, or 105 degrees Fahrenheit or higher, or a temperature falling within a range between any of the foregoing.

Figure 8:
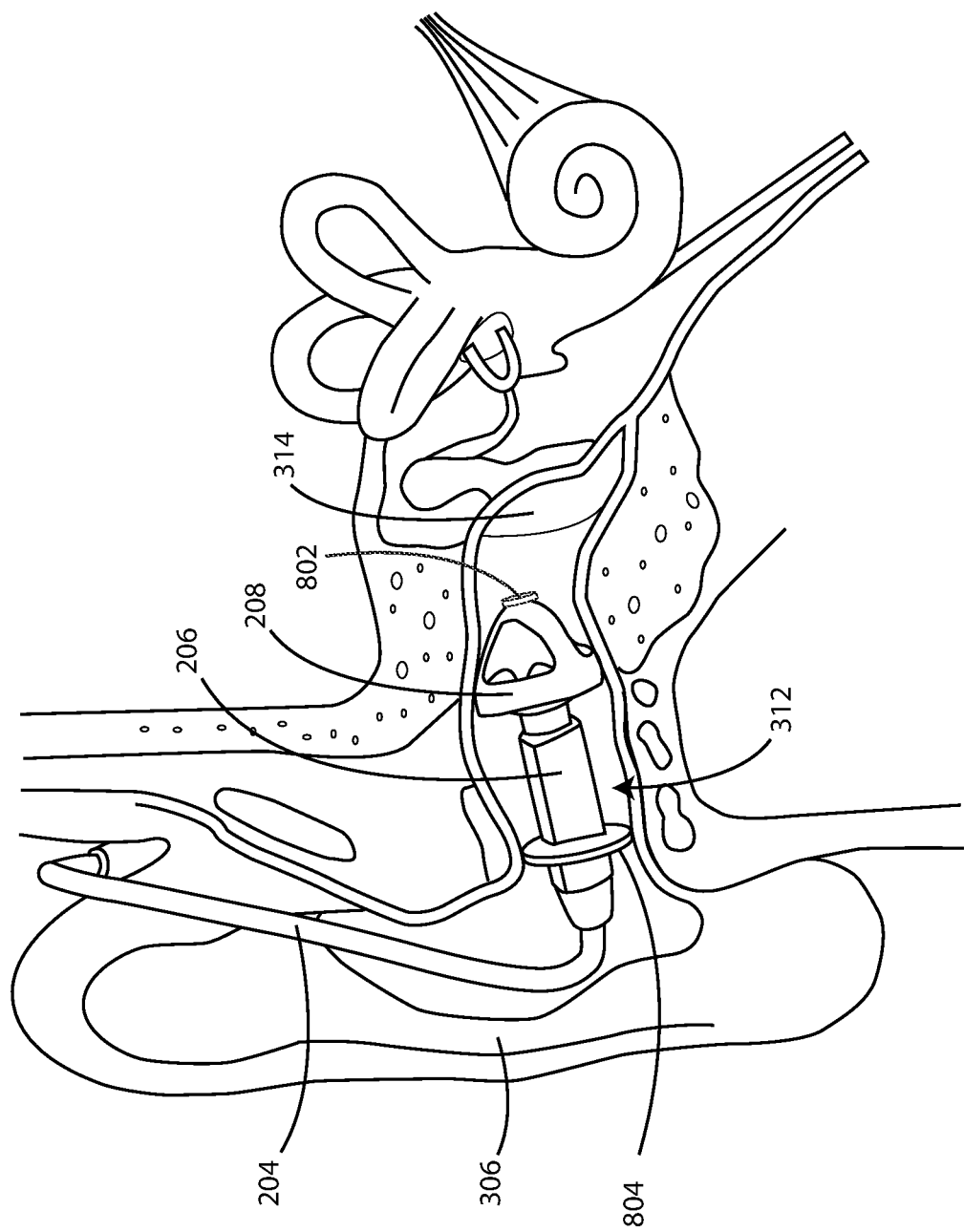
FIG. 8 is a schematic view of an ear-wearable monitoring device within an ear of a device wearer in accordance with various embodiments herein.

In some embodiments, heat stress can be detected by sensing the humidity of an air-filled area of the body, such as within the external auditory ear canal. Referring now to FIG. 8, a schematic view of an ear-wearable monitoring device within an ear of a device wearer is shown in accordance with various embodiments herein. As with some of the previous figures, the external ear 306 is shown along with the external auditory canal 312 and the tympanic membrane 314. Components of an ear-wearable device are shown including a cable 204, a receiver 206, and a cone 208. The ear-wearable device can include a humidity sensor 802 in order to detect the relative humidity within the external auditory canal or a portion thereof. While not intending to be bound by theory, it is believed that accurate measurements of humidity within the ear canal that can be indicative of heat stress are facilitated by at least partially blocking off a portion of the external ear-canal so that humidity therein does not simply pass through the external auditory canal and out the external ear to dissipate in the surrounding environment. As such, in some embodiments the ear-wearable device includes a sealing member 804. The sealing member 804 can take on various forms. In some embodiments, the sealing member 804 can take the form of a sealing baffle and can be mounted on another component of the ear-wearable device such as mounted on the receiver 206 as shown in FIG. 8. In some embodiments, the sealing member 804 can take the form of a sealing dome. In this case, the sealing member 804 isolates a portion of the external auditory canal adjacent the tympanic membrane. In some embodiments herein, the humidity sensor 802 can be configured to measure humidity within an ear canal of a wearer of the ear-wearable monitoring system 700 between the sealing dome and a tympanic membrane 314 of the wearer.

Figure 9:
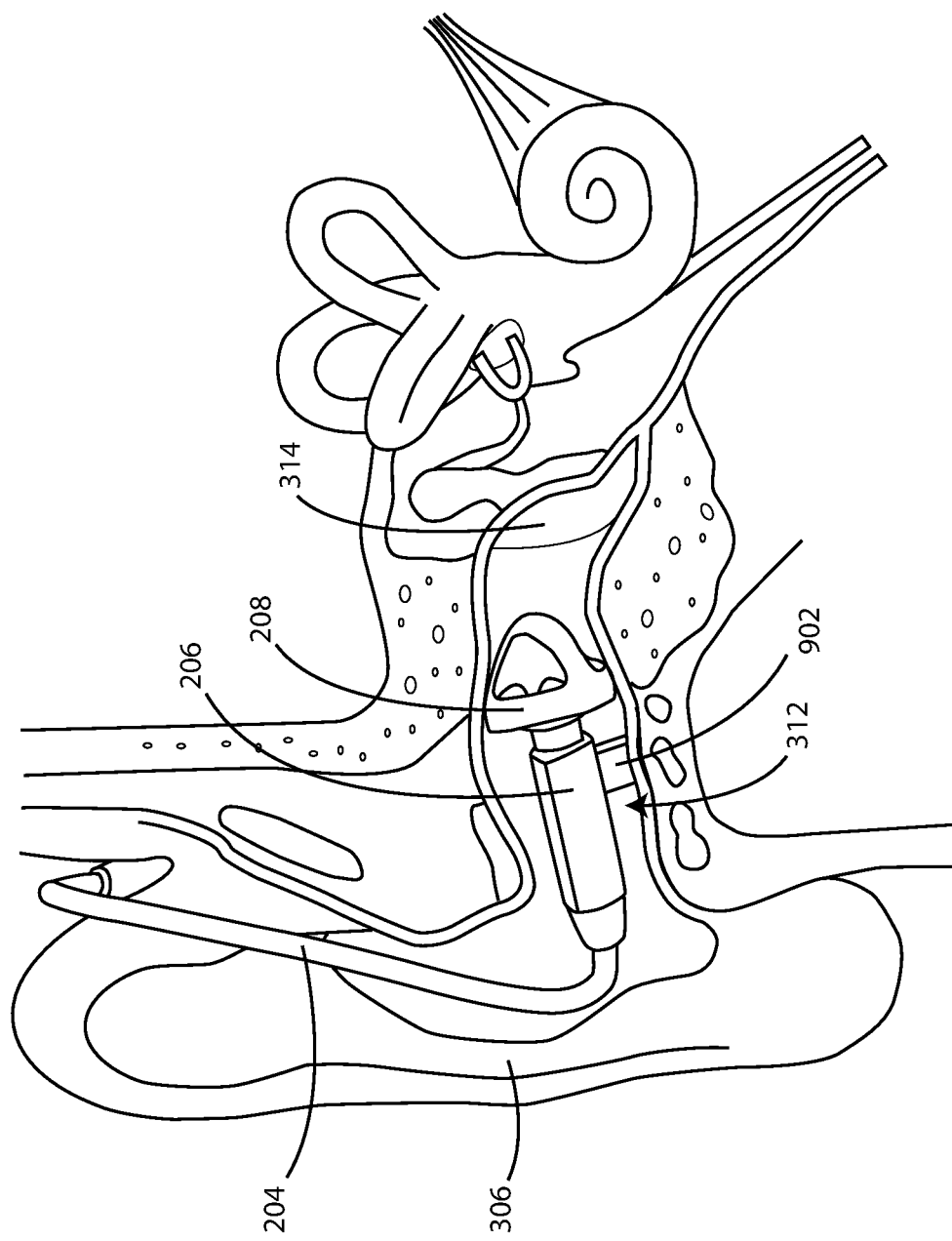
FIG. 9 is a schematic view of an ear-wearable monitoring device within an ear of a device wearer in accordance with various embodiments herein.
Figure 10:
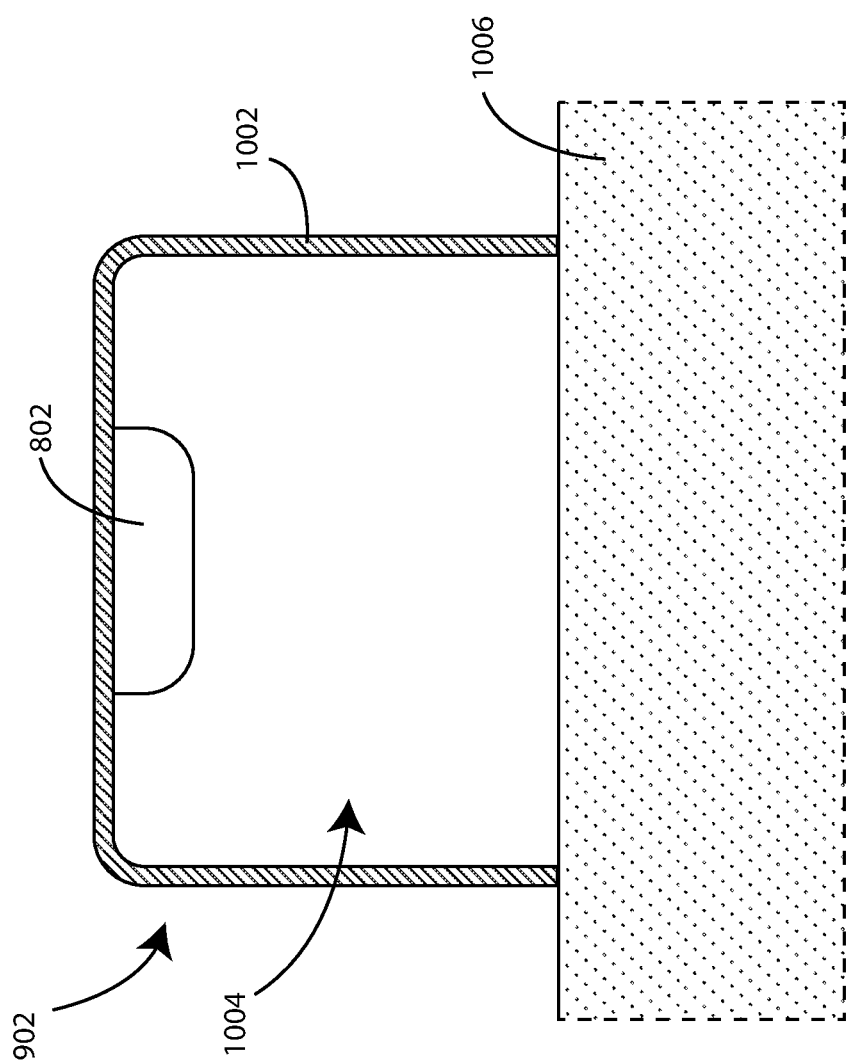
FIG. 10 is a schematic view of a heat shroud in accordance with various embodiments herein.

In some embodiments, a shroud or similar cover can be used around the heat stress sensor to isolate a small space within the external auditory canal. Referring now to FIG. 9, a schematic view of an ear-wearable monitoring device within an ear of a device wearer 100 is shown in accordance with various embodiments herein. FIG. 9 is generally similar to FIG. 8. However, in this example, FIG. 8 depicts a device without the sealing member of FIG. 8, but including a humidity shroud 902. FIG. 10 shows a schematic sectional view of a humidity shroud 902 in accordance with various embodiments herein. The external auditory canal has an auditory canal surface 1006. The humidity shroud 902 includes a shroud housing 1002 defining an interior space 1004. A humidity sensor 802 can disposed so that it can measure humidity within the interior space 1004.

It will be appreciated that ear-wearable devices herein can take on many different forms. In some embodiments, the ear-wearable device can be in the form of an in-the-ear style custom ear-wearable device. While not intending to be bound by theory, it is believed that certain form factors, such as an in-the-ear style custom ear-wearable device, can have better mechanical coupling to the external auditory canal which can be advantageous for measuring humidity therein.

Figure 11:
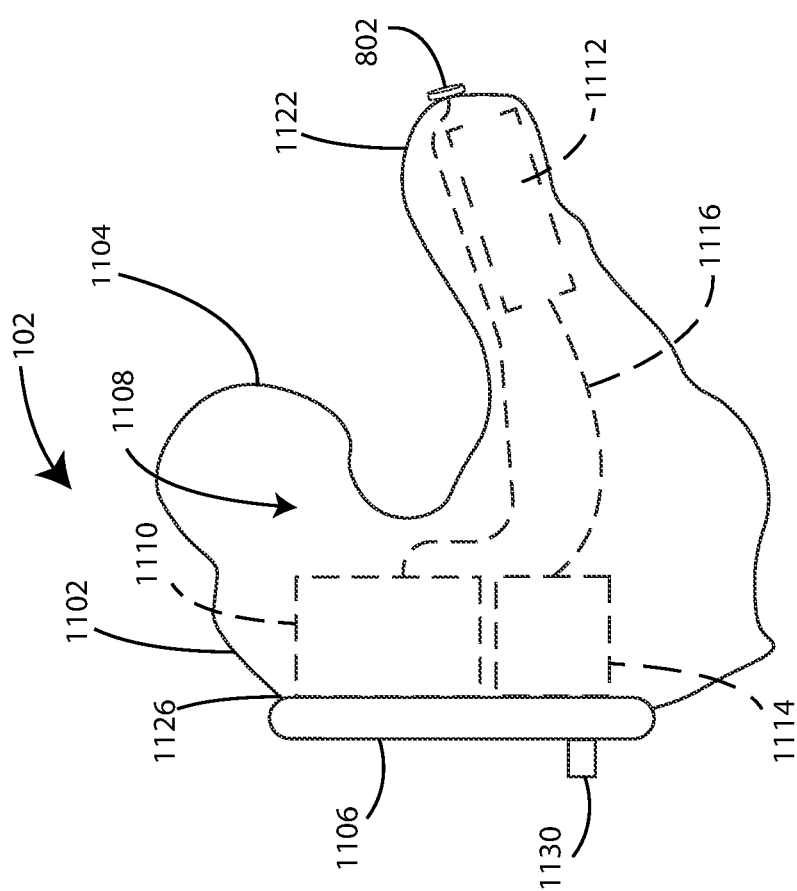
FIG. 11 is a schematic view of an ear-wearable monitoring device in accordance with various embodiments herein.

Referring now to FIG. 11, a schematic view of an in-the-ear style custom ear-wearable device 102 which can be used as a heat stress monitoring device herein is shown in accordance with various embodiments herein. The ear-wearable device 102 can include an ear-wearable device housing 1102 formed by a shell 1104 and a faceplate 1106. The shell 1104 can be custom shaped to mate with the user's ear anatomy and can define an internal shell cavity 1108 and a shell aperture at the entrance to the shell cavity 1108. The faceplate 1106 is attached to the shell at the shell aperture to enclose the shell cavity 1108.

The ear-wearable device housing 1102 can define a battery compartment 1110 in which a battery can be disposed to provide power to the device. The ear-wearable device 102 can also include a receiver 1112. The receiver 1112 can include a component that converts electrical impulses into sound, such as an electroacoustic transducer, speaker, or loudspeaker. The housing 1102 can also define a component compartment 1114 that can contain electrical and other components including but not limited to a microphone, a processor, memory, various sensors, one or more communication devices, power management circuitry, and a control circuit. A cable 1116 or connecting wire can include one or more electrical conductors and provide electrical communication between components inside of the component compartment 1114 and components inside of the receiver 1112.

The shell 1104 extends from an ear canal end 1122 to an aperture end 1126. At the aperture end 1126, the shell 1104 defines an aperture that is closed by the faceplate 1106. The faceplate 1106 is sealed to the shell 1104. The faceplate 1106 is shown in FIG. 11 only in a side view but can include many features and structures. A user input device 1130 is shown as part of the faceplate in FIG. 11, and can be a button, lever, switch, dial, or other input device. The faceplate 1106 may also include a battery door, a microphone opening, a pull handle, and other features.

In various embodiments, a humidity sensor 802 can be disposed on or adjacent to the ear canal end 1122. The humidity sensor 802 can be, for example, a capacitive humidity sensor, a resistive humidity sensor, a thermal conductivity humidity sensor, or the like. When positioned within the ear canal (see, e.g., FIG. 12) the shell 1104 can act as a barrier to provide a space in in the ear canal in which humidity can be sensed more accurately. As such, positioning the humidity sensor 802 on or adjacent the ear canal end 1122 of the shell 1104 provides an ideal location for the humidity sensor 802 to sense humidity.

The ear-wearable device 102 shown in FIG. 11 is an in-the-ear style device and thus the shell is designed to be placed within the ear cavity. However, it will be appreciated that many different form factors for ear-wearable devices are contemplated herein. Aspects of ear-wearable devices and functions thereof are described in U.S. Pat. No. 9,848,273; U.S. Publ. Pat. Appl. No. 20180317837; and U.S. Publ. Pat. Appl. No. 20180343527, the content of all of which is herein incorporated by reference in their entirety.

Figure 12:
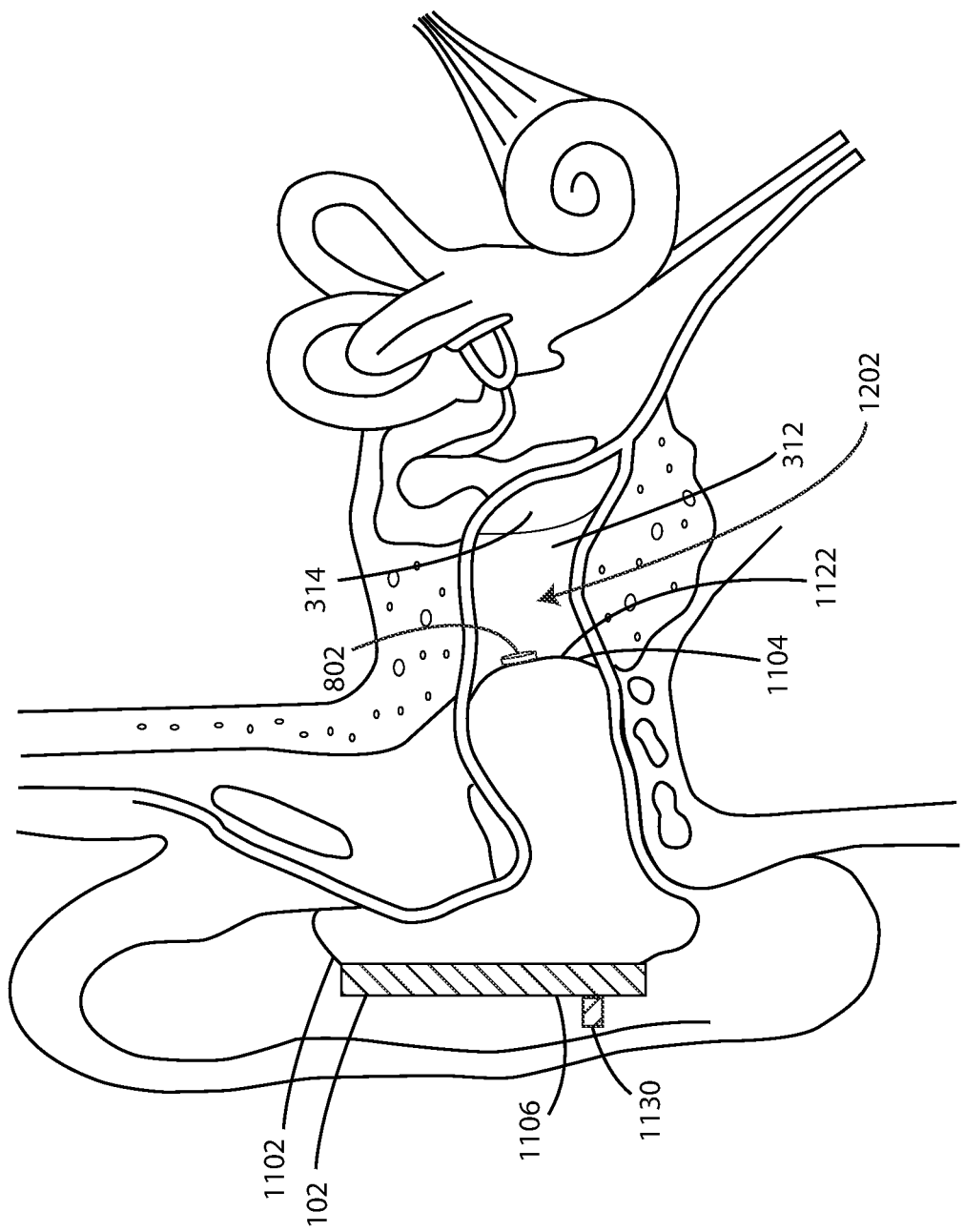
FIG. 12 is a schematic view of an ear-wearable monitoring device within an ear of a device wearer in accordance with various embodiments herein.

FIG. 12 is a schematic view of an ear-wearable device 102 disposed within the ear of a wearer in accordance with various embodiments herein. The housing 1102 of the ear-wearable device 102 is defined by the shell 1104, which is positioned within the external auditory canal 312 (or ear canal), and the faceplate 1106, which is positioned in the concha. The user input device 1130 on the faceplate 1106 is accessible to be manipulated by the user without having to remove the ear-wearable device from their ear. The ear canal end 1122 of the shell 1104 is positioned close to the user's tympanic membrane. Ideally, the shell 1104 fits properly within the user's ear cavity. A proper fit is usually one in which the ear-wearable device forms an acoustic seal with the user's ear cavity, so that it is contacting the ear cavity around a circumference of the ear-wearable device at some location on the shell 1104 of the ear-wearable device 102. A proper fit is also comfortable to the user, so that the shell 1104 is not putting too much pressure on the walls of the external auditory canal 312 or features of the concha. The receiver 1112 (FIG. 11) is positioned within the shell 1104 at the ear canal end 1122 of the shell 1104 to minimize the distance between the receiver 1112 and the tympanic membrane 314 without physically contacting the tympanic membrane 314.

As can be seen in FIG. 12, the shell 1104 forms a barrier creating a space 1202 in in the ear canal in which humidity can be sensed more accurately. As such, positioning the humidity sensor 802 on or adjacent the ear canal end 1122 of the shell 1104 allows the humidity sensor 802 to be exposed to the space 1202 providing an ideal location for the humidity sensor 802 to sense humidity.

In various embodiments, ear-wearable devices herein and related systems can be used to detect oropharyngeal events (both normal and abnormal) including, but not limited to, mastication, swallowing, drinking, and the like. These events can be used to identify events including the input of water (such as drinking of fluids). As such, embodiments herein include ear-worn devices and related systems that can be used to track aspects such as eating, drinking, swallowing, and other oropharyngeal events. In some embodiments, an exemplary a first ear-worn device can include a control circuit, a motion sensor, one or more microphones, an electroacoustic transducer, and a power supply or power supply circuit. The ear-worn device system can be configured to monitor signals from at least one of the motion sensor and the microphone and evaluate the signals to identify oropharyngeal events. As such, in various embodiments herein, an ear-wearable monitoring system can be configured to identify drinking events based at least in part on signals from the microphone and record the same.

Certain oropharyngeal events such as drinking are frequently accompanied by a characteristic head movement immediately prior to the event. For example, an individual commonly tips their head backward before beginning to drink from a glass. In some embodiments, ear-worn device systems herein are configured to evaluate the signals from a motion sensor to identify when the device wearer tips their head backward. In some embodiments, signal evaluation to identify oropharyngeal events includes evaluating signals from the motion sensor followed sequentially by evaluating signals from the microphone to detect sounds consistent with drinking.

In some embodiments, weighting factors for identification of oropharyngeal events, such as drinking events, can vary depending on whether another event is detected. For example, weighting factors can be changed such that signals from one or more microphones, motion sensors, or other sensors occurring immediately after head or jaw movement characteristic of the device wearer bringing a drink to their lips are more likely to be deemed a drinking event than are signals from the sensors in the absence of such head or jaw movements.

In various embodiments, devices and systems herein can be configured to distinguish between sounds originating at or near a sound origin associated with drinking versus sounds originating at other points within or outside of the body of the subject. In an embodiment, signal evaluation or processing to identify drinking events can include evaluating signals from the microphone of the first ear-worn device and signals from a microphone of the second ear-worn device and selecting those signals emanating from a spatial location that is laterally between the first ear-worn device and the second ear-worn device and posterior to the lips of the ear-worn device wearer.

In some embodiments, the number of identified drinking events (with or without an estimation of how much fluid was consumed) can be used to evaluate whether heat stress or circumstances that can lead to heat stress are present. In some embodiments, the system herein can track average numbers of drinking events over given time periods (such as per hour, per day, per week, etc.) and compare such numbers against those previously recorded for the individual (as one example of a baseline for the individual). In various embodiments, the ear-wearable monitoring system can be configured to issue an alert if a number of identified drinking events over a defined time period change by at least a threshold value. For example, the system can issue an alert if the number of identified drinking events decreases by 5, 10, 15, 20, 25, 30, 35, 40, 45, 50, 60, 70, or 80 percent or more, or a value falling within a range between any of the foregoing.

Figure 13:
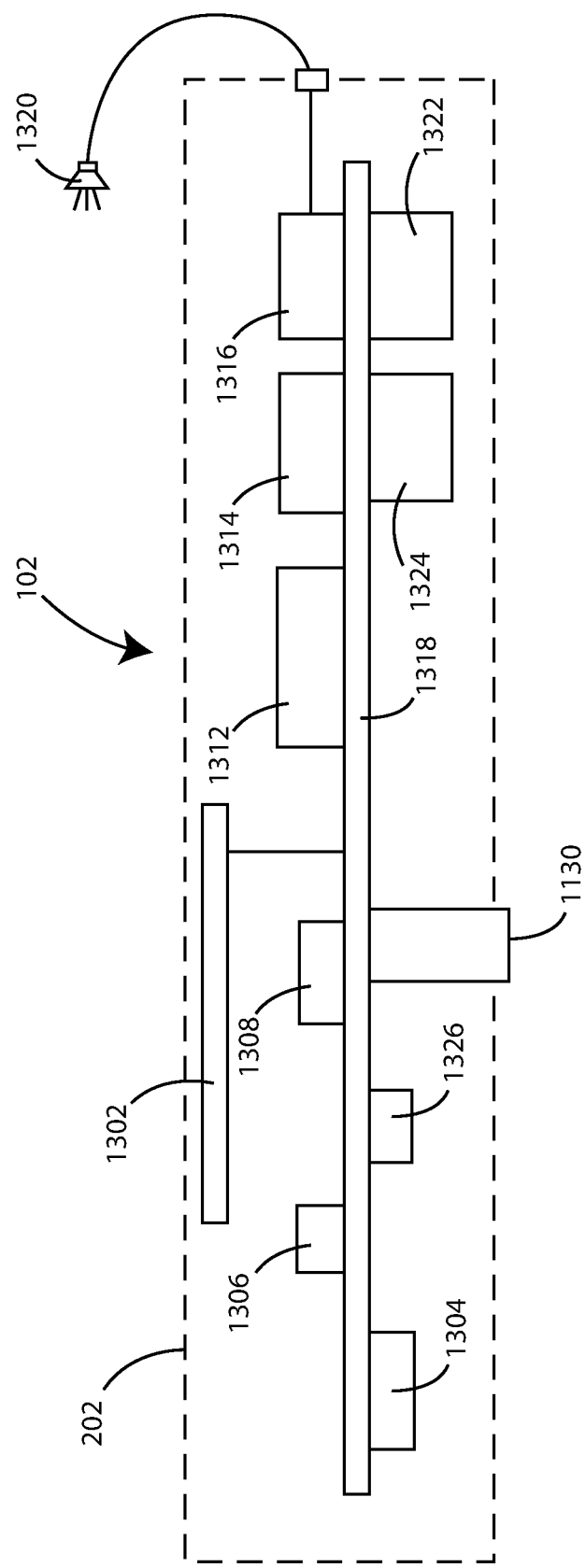
FIG. 13 is a block diagram of components of an ear-wearable monitoring device in accordance with various embodiments herein.

Referring now to FIG. 13, a schematic block diagram of components of an ear-wearable device is shown in accordance with various embodiments herein. The block diagram of FIG. 13 represents a generic ear-wearable device for purposes of illustration. The ear-wearable device 102 shown in FIG. 13 includes several components electrically connected to a mother circuit 1318 (e.g., mother board) which is disposed within housing 202. A power supply 1304 or power supply circuit can include a battery and circuitry to regulate power and can be electrically connected to the flexible mother circuit 1318 and provides power to the various components of the ear-wearable device 102. One or more microphones 1306 are electrically connected to the flexible mother circuit 1318, which provides electrical communication between the microphones 1306 and a digital signal processor (DSP) 1312. Among other components, the DSP 1312 incorporates or is coupled to audio signal processing circuitry configured to implement various functions described herein. A sensor package 1314 can be coupled to the DSP 1312 via the flexible mother circuit 1318. The sensor package 1314 can include one or more different specific types of sensors such as those described in greater detail below. One or more user input devices 1130 (e.g., on/off, volume, mic directional settings) can be electrically coupled to the DSP 1312 and/or other components via the flexible mother circuit 1318.

An audio output device 1316 is electrically connected to the DSP 1312 via the flexible mother circuit 1318. In some embodiments, the audio output device 1316 comprises an electroacoustic transducer or speaker (coupled to an amplifier). In other embodiments, the audio output device 1316 comprises an amplifier coupled to an external receiver 1320 adapted for positioning within an ear of a wearer. The external receiver 1320 can include an electroacoustic transducer, speaker, or loudspeaker.

The ear-wearable device 102 may incorporate a communication device 1308 coupled to the flexible mother circuit 1318 and to an antenna 1302 directly or indirectly via the flexible mother circuit 1318. The communication device 1308 can be a BLUETOOTH® transceiver, such as a BLE (BLUETOOTH® low energy) transceiver or other transceiver(s) (e.g., an IEEE 602.11 compliant device). The communication device 1308 can be configured to communicate with one or more external devices, such as those discussed previously, in accordance with various embodiments. In various embodiments, the communication device 1308 can be configured to communicate with an external visual display device such as a smart phone, a video display screen, a tablet, a computer, or the like.

In some embodiments, ear-wearable devices 102 of the present disclosure can incorporate an antenna arrangement coupled to a high-frequency radio, such as a 2.4 GHz radio. The radio can conform to an IEEE 602.11 (e.g., WIFI®) or BLUETOOTH® (e.g., BLE, BLUETOOTH® 4.2 or 5.0) specification, for example. It is understood that ear-wearable devices of the present disclosure can employ other radios, such as a 900 MHz radio or radios operating at other frequencies or frequency bands. Ear-wearable device of the present disclosure can also include hardware, such as one or more antennas, for NFMI or NFC wireless communications. Ear-wearable devices of the present disclosure can be configured to receive streaming audio (e.g., digital audio data or files) from an electronic or digital source.

Ear-wearable devices 102 of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files. Systems herein can also include these types of accessory devices as well as other types of devices.

In various embodiments, the ear-wearable device 102 can also include a control circuit 1322 and a memory storage device 1324. The control circuit 1322 can be in electrical communication with other components of the device. In some embodiments, a clock circuit 1326 can be in electrical communication with the control circuit. The control circuit 1322 can execute various operations, such as those described herein. The control circuit 1322 can include various components including, but not limited to, a microprocessor, a microcontroller, an FPGA (field-programmable gate array) processing device, an ASIC (application specific integrated circuit), or the like. The memory storage device 1324 can include both volatile and non-volatile memory. The memory storage device 1324 can include ROM, RAM, flash memory, EEPROM, SSD devices, NAND chips, and the like. The memory storage device 1324 can be used to store data from sensors as described herein and/or processed data generated using data from sensors as described herein.

It will be appreciated that various of the components described in FIG. 13 can be associated with separate devices and/or accessory devices to the ear-wearable device. By way of example, microphones can be associated with separate devices and/or accessory devices. Similarly, audio output devices can be associated with separate devices and/or accessory devices to the ear-wearable device.

Accessory devices herein can include various different components. In some embodiments, the accessory device can be a personal communications device, such as a smart phone. However, the accessory device can also be other things such as a secondary wearable device, a handheld computing device, a dedicated location determining device (such as a handheld GPS unit), or the like.

Figure 14:
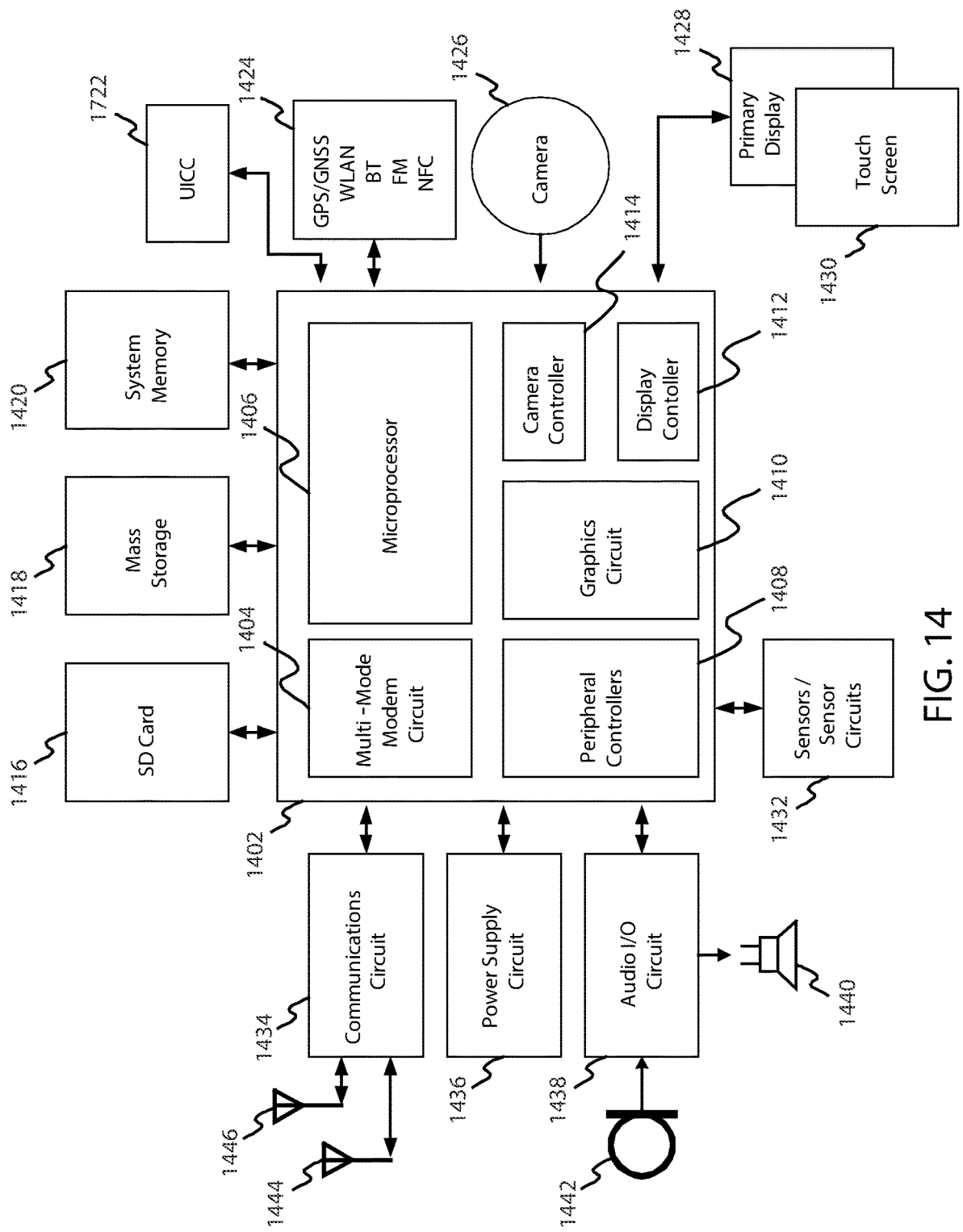
FIG. 14 is a block diagram of components of an accessory device in accordance with various embodiments herein.

Referring now to FIG. 14, a schematic block diagram is shown of components of an accessory device 104 (which could be a personal communications device or another type of accessory device) in accordance with various embodiments herein. This block diagram is just provided by way of illustration and it will be appreciated that accessory devices can include greater or lesser numbers of components. The accessory device in this example can include a control circuit 1402. The control circuit 1402 can include various components which may or may not be integrated. In various embodiments, the control circuit 1402 can include a microprocessor 1406, which could also be a microcontroller, FPGA, ASIC, or the like. The control circuit 1402 can also include a multi-mode modem circuit 1404 which can provide communications capability via various wired and wireless standards. The control circuit 1402 can include various peripheral controllers 1408. The control circuit 1402 can also include various sensors/sensor circuits 1432. The control circuit 1402 can also include a graphics circuit 1410, a camera controller 1414, and a display controller 1412. In various embodiments, the control circuit 1402 can interface with an SD card 1416, mass storage 1418, and system memory 1420. In various embodiments, the control circuit 1402 can interface with universal integrated circuit card (UICC) 1722. A spatial location determining circuit can be included and can take the form of an integrated circuit 1424 that can include components for receiving signals from GPS, GLONASS, BeiDou, Galileo, SBAS, WLAN, BT, FM, NFC type protocols, 5G picocells, or E911. In various embodiments, the accessory device can include a camera 1426. In various embodiments, the control circuit 1402 can interface with a primary display 1428 that can also include a touch screen 1430. In various embodiments, an audio I/O circuit 1438 can interface with the control circuit 1402 as well as a microphone 1442 and a speaker 1440. In various embodiments, a power supply or power supply circuit 1436 can interface with the control circuit 1402 and/or various other circuits herein in order to provide power to the system. In various embodiments, a communications circuit 1434 can be in communication with the control circuit 1402 as well as one or more antennas (1444, 1446).

Pattern Identification and Matching

It will be appreciated that in various embodiments herein, a device or a system can be used to detect a pattern or patterns (such as patterns of data from sensors) indicative of a state of heat stress. Also, it will be appreciated that in various embodiments herein, a device or a system can be used to detect a pattern or patterns indicative of a specific event, such as exercise which can impact an individual's present heat condition. Such patterns can be detected in various ways. Some techniques are described elsewhere herein, but some further examples will now be described.

As merely one example, one or more sensors can be operatively connected to a controller (such as the control circuit described in FIG. 14) or another processing resource (such as a processor of another device or a processing resource in the cloud). The controller or other processing resource can be adapted to receive data representative of a characteristic of the subject from one or more of the sensors and/or determine statistics of the subject over a monitoring time period based upon the data received from the sensor. As used herein, the term "data" can include a single datum or a plurality of data values or statistics. The term "statistics" can include any appropriate mathematical calculation or metric relative to data interpretation, e.g., probability, confidence interval, distribution, range, or the like. Further, as used herein, the term "monitoring time period" means a period of time over which characteristics of the subject are measured and statistics are determined. The monitoring time period can be any suitable length of time, e.g., 10 seconds, 30 seconds, 1 minute, 10 minutes, 30 minutes, 1 hour, 1 day, 1 week, etc., or a range of time between any of the foregoing time periods.

Any suitable technique or techniques can be utilized to determine statistics for the various data from the sensors, e.g., direct statistical analyses of time series data from the sensors, differential statistics, comparisons to baseline or statistical models of similar data, etc. Such techniques can be general or individual-specific and represent long-term or short-term behavior. These techniques could include standard pattern classification methods such as Gaussian mixture models, clustering as well as Bayesian approaches, neural network models and deep learning, and the like.

Further, in some embodiments, the controller can be adapted to compare data, data features, and/or statistics against various other patterns, which could be prerecorded patterns (baseline patterns) of the particular individual wearing an ear-wearable device herein, prerecorded patterns (group baseline patterns) of a group of individuals wearing ear-wearable devices herein, one or more predetermined patterns that serve as positive example patterns (such as patterns indicative of heat stress states), negative example patterns, or the like. As merely one scenario, if a pattern is detected in an individual that exhibits similarity crossing a threshold value to a positive example pattern or substantial similarity to that pattern, then that can be taken as an indication of the presence of a level of heat stress or other condition associated with the positive example pattern. Positive and/or negative example patterns can be stored or accessed for use covering those items to be detected in accordance with embodiments herein including, but not limited to, states of heat stress, clinical signs of heat stress, events impacting heat stress such as drinking and activity, relevant events with characteristic sounds such as the licking or smacking of lips, environmental conditions impacting heat stress such as weather, temperature, humidity, and the like and other items discussed elsewhere herein.

Similarity and dissimilarity can be measured directly via standard statistical metrics such normalized Z-score, or similar multidimensional distance measures (e.g. Mahalanobis or Bhattacharyya distance metrics), or through similarities of modeled data and machine learning. These techniques can include standard pattern classification methods such as Gaussian mixture models, clustering as well as Bayesian approaches, neural network models, and deep learning.

As used herein the term "substantially similar" means that, upon comparison, the sensor data are congruent or have statistics fitting the same statistical model, each with an acceptable degree of confidence. The threshold for the acceptability of a confidence statistic may vary depending upon the subject, sensor, sensor arrangement, type of data, context, condition, etc.

The statistics associated with the heat stress status of an individual over the monitoring time period, can be determined by utilizing any suitable technique or techniques, e.g., standard pattern classification methods such as Gaussian mixture models, clustering, hidden Markov models, as well as Bayesian approaches, neural network models, and deep learning.

Various embodiments herein specifically include the application of a machine learning classification model. In various embodiments, the ear-wearable system can be configured to periodically update the machine learning classification model based on indicators of heat stress experienced by the device wearer and/or by observing heat stress symptoms experienced by the device wearer.

In some embodiments, a training set of data can be used in order to generate a machine learning classification model. The input data can include microphone and/or sensor data as described herein as tagged/labeled with binary and/or non-binary classifications of heat stress and/or heat stress symptoms. Binary classification approaches can utilize techniques including, but not limited to, logistic regression, k-nearest neighbors, decision trees, support vector machine approaches, naive Bayes techniques, and the like. Multi-class classification approaches (e.g., for non-binary classifications of triggers and/or allergic reactions) can include k-nearest neighbors, decision trees, naive Bayes approaches, random forest approaches, and gradient boosting approaches amongst others.

In various embodiments, the ear-wearable system is configured to execute operations to generate or update the machine learning model on the ear-wearable device itself. In some embodiments, the ear-wearable system may convey data to another device such as an accessory device or a cloud computing resource in order to execute operations to generate or update a machine learning model herein. In various embodiments, the ear-wearable system is configured to weight certain possible detected indicators of heat stress in the machine learning classification model more heavily based on derived correlations specific for the individual as described elsewhere herein.

Temperature Measurement Normalization

In various embodiments herein, the device or system can normalize temperature measurements to provide a more accurate determination of whether temperature (such as core temperature) of the device wearer is abnormal. For example, temperature exhibits a strong circadian pattern. The origin of the circadian rhythm of core temperature is believed to be mainly due to circadian changes in the rate of loss of heat through the extremities, mediated by vasodilation of the cutaneous vasculature. As such, accurately comparing a temperature taken at time "A" to a normal value can include normalizing the temperature at time "A" to account for circadian temperature rhythms. In some embodiments, normalization can include adjustments made based on a calibration curve or calibration table as a function of time of day. In some embodiments, values for the calibration curve or table can be predetermined. In other embodiments, values for the calibration curve or table can be determined as part of a learning phase based on observing normal circadian temperature change for the device wearer over a period of time.

Illness including viral infections can cause core temperature to change abnormally. For example, various viral infections can cause core body temperature to increase, commonly known as a fever. As such, in various embodiments herein the device or system can utilize information regarding a health status (such as the presence of an infection) in order to more accurately determine heat stress. In some embodiments, information regarding an infection can be obtained based on an input from an individual (such as the device wearer or a care provider) or an input from another system, such as an electronic medical records system. In some embodiments, the system or device can suspend evaluation for heat stress when an illness such as a viral infection is present.

In some embodiments, the system or device can itself distinguish between heat stress and a fever. It will be appreciated that if only temperature is evaluated, then distinguishing between heat stress and a fever is difficult. However, in various embodiments herein, other factors can be used to distinguish between heat stress and a fever. For example, the system can evaluate environmental conditions, activity levels, hydration, and the like (e.g., conditions likely to generate an increase in core body temperature) to eliminate fever as a cause of a measured increase in core body temperature.

Exercise typically causes an initial rise of core temperature before reaching an equilibrium value. As such, in various embodiments herein the device or system can utilize information regarding physical activity such as exercise to more accurately determine heat stress. Physical activity or exercise can be detected in various ways herein. By way of example, signals from a motion sensor herein can be evaluated to detect motion patterns that are characteristic of exercise. Signals from a motion sensor herein can be evaluated to determine a step count and/or a step count rate. In some embodiments, signals from an ECG sensor can be evaluated to detect an elevated heart rate that is characteristic of exercise. In some embodiments, if it is determined that the individual is exercising then temperature measurements can be normalized to account for the characteristic rise in temperature associated with exercise. In some embodiments, normalization can include adjustments made based on a calibration curve or calibration table as a function of exercise intensity or steps per unit time. In some embodiments, values for the calibration curve or table can be predetermined. In other embodiments, values for the calibration curve or table can be determined as part of a learning phase based on observing temperature changes associated with exercise, including different intensities of exercise, for the device wearer over a period of time.

Methods

Many different methods are contemplated herein, including, but not limited to, methods of making devices and systems herein, methods of using devices and systems herein, methods of detecting a heat stress risk, methods of monitoring an individual for heat stress, methods of monitoring ear canal humidity, and the like. Aspects of system/device operation described elsewhere herein can be performed as operations of one or more methods in accordance with various embodiments herein.

In an embodiment, a method of assessing heat stress risk for a device wearer is included, the method can include processing signals of one or more sensors of a sensor package and/or a microphone of an ear-wearable device, detecting dehydration symptoms, environmental conditions, and activity levels of the device wearer based on the processed signals, and determining a heat stress risk level based on detected dehydration symptoms, environmental conditions, activity levels of the device wearer, and a pre-existing health condition of the device wearer.

In an embodiment, the method can further include receiving data from at least one external sensor or external system.

In an embodiment, the method can further include processing signals of the microphone to detect signs of heat stress.

In an embodiment, the method can further include issuing an alert when the heat stress risk level crosses a threshold value. In an embodiment, the method can further include issuing an alert when the heat stress risk level crosses a threshold value for at least a threshold period of time. In an embodiment, the method can further include issuing an alert with a suggested countermeasure when the heat stress risk level crosses a threshold value. In an embodiment, the method can further include issuing a series of escalating alerts based on the heat stress risk level crossing a series of threshold values.

In an embodiment, the method can further include classifying an observed pattern representing signals from the microphone and the sensor package into categories of heat stress, heat exhaustion, or heat stroke using a machine learning derived algorithm.

Sensors

Ear-wearable devices herein can include one or more sensor packages (including one or more discrete or integrated sensors) to provide data. The sensor package can comprise one or a multiplicity of sensors. In some embodiments, the sensor packages can include one or more motion sensors (or movement sensors) amongst other types of sensors. Motion sensors herein can include inertial measurement units (IMU), accelerometers, gyroscopes, barometers, altimeters, and the like. The IMU can be of a type disclosed in commonly owned U.S. Pat. No. 9,848,273, which is incorporated herein by reference. In some embodiments, electromagnetic communication radios or electromagnetic field sensors (e.g., telecoil, NFMI, TMR, GMR, etc.) sensors may be used to detect motion or changes in position. In various embodiments, the sensor package can include a magnetometer. In some embodiments, biometric sensors may be used to detect body motions or physical activity. Motions sensors can be used to track movement of a patient in accordance with various embodiments herein.

In some embodiments, the motion sensors can be disposed in a fixed position with respect to the head of a patient, such as worn on or near the head or ears. In some embodiments, the operatively connected motion sensors can be worn on or near another part of the body such as on a wrist, arm, or leg of the patient.

According to various embodiments, the sensor package can include one or more of an IMU, and accelerometer (3, 6, or 9 axis), a gyroscope, a barometer, an altimeter, a magnetometer, a magnetic sensor, an eye movement sensor, a pressure sensor, an acoustic sensor, a telecoil, a heart rate sensor, a global positioning system (GPS), a microphone, an acoustic sensor, a wireless radio antenna, an air quality sensor, an optical sensor, a light sensor, an image sensor, a temperature sensor, a physiological sensor such as a blood pressure sensor, an oxygen saturation sensor, a blood glucose sensor (optical or otherwise), a galvanic skin response sensor, a resistive sensor to measure salinity of a fluid (for example a sensor including at least two electrodes and wherein resistance is inversely correlated with salinity), a cortisol level sensor (optical or otherwise), an electrocardiogram (ECG) sensor, electroencephalography (EEG) sensor which can be a neurological sensor, eye movement sensor (e.g., electrooculogram (EOG) sensor), myographic potential electrode sensor (EMG), a heart rate monitor, a pulse oximeter or oxygen saturation sensor (SpO2), blood perfusion sensor, hydrometer, sweat sensor, humidity sensor, cerumen sensor, pupillometry sensor, hematocrit sensor, or the like.

In various embodiments, one or more of the sensors described herein can be mounted on an "in-the-ear" or "behind-the-ear" portion of the ear-wearable device (such as on a housing thereof, on a receiver, etc.). In some embodiments, a resistive sensor for measuring "wetness" and/or salinity can be mounted on an "in-the-ear" or "behind-the-ear" portion of the ear-wearable device.

In some embodiments, the sensor package can be part of an ear-wearable device. However, in some embodiments, the sensor packages can include one or more additional sensors that are external to an ear-wearable device. For example, various of the sensors described above can be part of a wrist-worn or ankle-worn sensor package, or a sensor package supported by a chest strap. In some embodiments, sensors herein can be disposable sensors that are adhered to the device wearer ("adhesive sensors") and that provide data to the ear-wearable device or another component of the system.

Data produced by the sensor(s) of the sensor package can be operated on by a processor of the device or system.

As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration and a gyroscope to detect rotational acceleration and/or velocity. In some embodiments, an IMU can also include a magnetometer to detect a magnetic field.

An eye movement sensor herein be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

A temperature sensor herein can be, for example, a thermistor (thermally sensitive resistor), a resistance temperature detector, a thermocouple, a semiconductor-based sensor, an infrared sensor, or the like.

A blood pressure sensor herein can be, for example, a pressure sensor. The heart rate sensor can be, for example, an electrical signal sensor, an acoustic sensor, a pressure sensor, an infrared sensor, an optical sensor, or the like.

An oxygen saturation sensor (such as a blood oximetry sensor) herein can be, for example, an optical sensor, an infrared sensor, a visible light sensor, or the like.

An electrical signal sensor herein can include two or more electrodes and can include circuitry to sense and record electrical signals including sensed electrical potentials and the magnitude thereof (according to Ohm's law where $V=IR$) as well as measure impedance from an applied electrical potential.

A humidity sensor herein can be, for example, a capacitive humidity sensor, a resistive humidity sensor, a thermal conductivity humidity sensor, or the like.

It will be appreciated that the sensor package can include one or more sensors that are external to the ear-wearable device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An ear-wearable heat stress risk assessment system comprising:
    a control circuit;
    a microphone, wherein the microphone is in electrical communication with the control circuit; and
    a sensor package, wherein the sensor package is in electrical communication with the control circuit;
    wherein the system is configured to;
        process signals of one or more sensors of the sensor package and the microphone;
        detect dehydration symptoms, environmental conditions, and activity levels of a device wearer based on the processed signals; and
        determine a heat stress risk level based on the detected dehydration symptoms, environmental conditions, activity levels of the device wearer, and a preexisting health condition of the device wearer, wherein the system is configured to classify an observed pattern representing signals from the microphone and the sensor package into categories of heat stress, heat exhaustion, or heat stroke using a machine learning derived algorithm.

2. The system of claim 1, the sensor package comprising a temperature sensor.

3. The system of claim 2, the sensor package comprising at least one selected from the group consisting of a photoplethysmography sensor and a motion sensor.

4. The system of claim 2, the sensor package comprising at least one selected from the group consisting of a photoplethysmography (PPG) sensor, an electrocardiogramansor, an electromyography (EMG) sensor, a motion sensor, an electroencephalography (EEG) sensor, and a glucose sensor.

5. The system of claim 1, wherein the dehydration symptoms include one or more of rapid shallow breathing, increased pulse, decreased blood pressure, dizziness, dry mouth, changes in voice quality, increased temperature, delirium, and increased glucose concentration.

6. The system of claim 1, the sensor package comprising a resistive sensor to measure salinity of a perspiration fluid.

7. The system of claim 1, wherein the system is configured to receive data from at least one external sensor or external system.

8. The system of claim 7, wherein the external sensor is selected from the group consisting of a humidity sensor, an ambient temperature sensor, an ambient light sensor, and a sensor disposed on a charging device for the system.

9. The system of claim 7, wherein the external system is an HVAC system.

10. The system of claim 7, wherein the external system is a weather information system.

11. The system of claim 1, wherein the system is configured to process signals of the microphone to detect signs of heat stress.

12. The system of claim 11, wherein the signs of heat stress include an utterance or phrase matching at least one from a predetermined list of utterances and phrases.

13. The system of claim 1, wherein the system is configured to issue an alert when the heat stress risk level crosses a threshold value.

14. The system of claim 13, wherein the threshold value is dynamically set based on factors including one or more of an ambient temperature, an ambient humidity, activity levels of the device wearer, preexisting health conditions of the device wearer, and an estimated hydration level of the device wearer.

15. The system of claim 1, wherein the system is configured to issue an alert when the heat stress risk level crosses a threshold value for at least a threshold period of time.

16. The system of claim 1, wherein the system is configured to issue an alert with a suggested countermeasure when the heat stress risk level crosses a threshold value.

17. The system of claim 16, the suggested countermeasure comprising at least one of a suggestion to move to a cooler location, a suggestion to drink water, and a suggestion to reduce physical exertion.

18. The system of claim 1, wherein the system is configured to issue a series of escalating alerts based on the heat stress risk level crossing a series of threshold values.

19. An ear-wearable heat stress risk assessment system comprising:
    a control circuit;
    a microphone, wherein the microphone is in electrical communication with the control circuit; and
    a sensor package, wherein the sensor package is in electrical communication with the control circuit;
    wherein the system is configured to:
        process signals of one or more sensors of the sensor package and/or the microphone;
        detect dehydration symptoms, environmental conditions, and activity levels of a device wearer based on the processed signals; and
        determine a heat stress risk level based on detected dehydration symptoms, environmental conditions, activity levels of the device wearer, and a preexisting health condition of the device wearer, and
    wherein the system is configured to process signals of the microphone to detect signs of heat stress, and the signs of heat stress include an utterance or phrase matching at least one from a predetermined list of utterances and phrases.

20. An ear-wearable heat stress risk assessment system comprising:
    a control circuit;
    a microphone, wherein the microphone is in electrical communication with the control circuit; and
    a sensor package, wherein the sensor package is in electrical communication with the control circuit;
    wherein the system is configured to:
        process signals of one or more sensors of the sensor package and the microphone;

detect dehydration symptoms, environmental conditions, and activity levels of a device wearer based on the processed signals; and determine a heat stress risk level based on the detected dehydration symptoms, environmental conditions, activity levels of the device wearer, and a pre-existing health condition of the device wearer; and issue a series of escalating alerts based on the heat stress risk level crossing a series of threshold values.

* * * * *